(12) United States Patent
Gray et al.

(10) Patent No.: US 12,072,684 B2
(45) Date of Patent: Aug. 27, 2024

(54) SYSTEMS AND METHODS FOR ANALYZING STREAM-BASED DATA FOR ASSET OPERATION

(71) Applicant: ROCKWELL AUTOMATION TECHNOLOGIES, INC., Mayfield Heights, OH (US)

(72) Inventors: Edward A. Gray, Olmstead Township, OH (US); Norman A. Weatherhead, Kitchener (CA); Srikanth G. Mashetty, Houston, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/449,176

(22) Filed: Sep. 28, 2021

(65) Prior Publication Data

US 2022/0011739 A1    Jan. 13, 2022

Related U.S. Application Data

(62) Division of application No. 16/252,851, filed on Jan. 21, 2019, now Pat. No. 11,221,607.

(60) Provisional application No. 62/760,372, filed on Nov. 13, 2018.

(51) Int. Cl.
*G05B 19/406* (2006.01)

(52) U.S. Cl.
CPC .. *G05B 19/406* (2013.01); *G05B 2219/31449* (2013.01)

(58) Field of Classification Search
None
See application file for complete search history.

(56) References Cited

U.S. PATENT DOCUMENTS

| | | | |
|---|---|---|---|
| 6,925,347 B1 * | 8/2005 | Miller | G05B 19/41875 700/121 |
| 10,360,252 B1 | 7/2019 | Kraytem et al. | |
| 2002/0192966 A1 * | 12/2002 | Shanmugasundram | G05B 19/19 438/692 |
| 2004/0040746 A1 | 3/2004 | Niedermayr et al. | |
| 2007/0168057 A1 * | 7/2007 | Blevins | G05B 13/022 700/53 |
| 2011/0288837 A1 * | 11/2011 | Blevins | G05B 17/02 703/6 |
| 2015/0323913 A1 * | 11/2015 | Gilmore | G05B 13/04 700/275 |
| 2015/0371160 A1 | 12/2015 | Weatherhead et al. | |
| 2016/0003242 A1 * | 1/2016 | van der Merwe | G05B 13/048 700/282 |

(Continued)

*Primary Examiner* — Kenneth M Lo
*Assistant Examiner* — Istiaque Ahmed
(74) *Attorney, Agent, or Firm* — Foley & Lardner LLP

(57) ABSTRACT

A system includes a first asset and a second asset disposed at an industrial system, and a server communicatively coupled to the first asset and the second asset. The server device is configured to receive a first set of stream-based data from the first asset and generate a model for the second asset based on the first set of stream-based data, wherein the model is configured to output an expected set of stream-based data associated with the second asset; receive a second set of stream-based data from the second asset; and send a command to the first asset or the second asset in response to the second set of stream-based data being outside of a threshold from the expected set of stream-based data.

14 Claims, 11 Drawing Sheets

(56) References Cited

U.S. PATENT DOCUMENTS

| | | |
|---|---|---|
| 2016/0132618 A1 | 5/2016 | Lovell |
| 2016/0284073 A1* | 9/2016 | Michalscheck .... G05B 23/0216 |
| 2017/0276571 A1 | 9/2017 | Vitullo et al. |
| 2019/0003297 A1 | 1/2019 | Brannigan et al. |
| 2019/0128114 A1 | 5/2019 | Bryant et al. |
| 2019/0369963 A1 | 12/2019 | Utsumi et al. |
| 2020/0151199 A1 | 5/2020 | Nakamura |
| 2020/0341454 A1 | 10/2020 | Mizoguchi |

* cited by examiner

SYSTEMS AND METHODS FOR ANALYZING STREAM-BASED DATA FOR ASSET OPERATION

CROSS-REFERENCE TO RELATED APPLICATIONS

This application is a divisional of, and claims priority to, U.S. patent application Ser. No. 16/252,851, filed on Jan. 21, 2019 entitled "SYSTEMS AND METHODS FOR ANALYZING STREAM-BASED DATA FOR ASSET OPERATION", which claims priority from and the benefit of U.S. Provisional Application No. 62/760,372, filed Nov. 13, 2018, entitled "SYSTEMS AND METHODS FOR ANALYZING STREAM-BASED DATA FOR ASSET OPERATION", which are incorporated by reference herein in their entirety for all purposes.

BACKGROUND

The present disclosure relates generally to improving operations of a control system that monitors and controls the operation of one or more components of an industrial process (e.g., oil and gas production, chemical processing, manufacturing, food and/or beverage processing, etc.). More specifically, the present disclosure relates to performing analysis on data collected from the industrial process in real time or near real time (e.g., in seconds or minutes).

An industrial process may include a series of steps performed by a collection of respective components or assets. Typically sensors disposed at each component may collect data, which a control system of the component may compare to preset threshold values or ranges and then take one or more predetermined actions based on whether or not the collected data exceed the threshold values and/or fall within the preset ranges. Accordingly, the control system of each component may not take into account the state of the other components working in concert to perform the industrial process when controlling the component in real time or near real time. Further, the control system of each component may not take into account an underlying condition of the industrial process or a holistic view of some or all of the other components working in concert to perform the industrial process when controlling the component. Accordingly, improved systems and methods for controlling various components of the industrial process while considering the operations of other components in the industrial process are desirable.

BRIEF DESCRIPTION

In one embodiment, a system includes a first asset disposed at a first location in an industrial system configured to perform one or more operations, a second asset disposed at a second location in the industrial system, and a server device communicatively coupled to the first asset and the second asset. The server device is configured to receive a first set of stream-based data from the first asset, receive a second set of stream-based data from the second asset, identify a first portion of the first set of stream-based data and a second portion of the second set of stream-based data, wherein the first portion and the second portion comprises a same type of data, determine whether the first portion of the first set of stream-based data corresponds to an expected range of values based on the second portion of the second set of stream-based data, and send a command to the first asset to adjust a first set of operations in response to the first portion of the first set of stream-based data not being within the expected range of values.

In another embodiment, a system includes a first asset disposed at an industrial automation system, a second asset disposed at the industrial automation system, and a server communicatively coupled to the first asset and the second asset. The server is configured to receive a first set of stream-based data from the first asset, generate a model for the second asset based on the first set of stream-based data, wherein the model is configured to output an expected set of stream-based data associated with the second asset, receive a second set of stream-based data from the second asset, and send a command to the first asset or the second asset in response to the second set of stream-based data being outside of a threshold from the expected set of stream-based data.

In yet another embodiment, a method includes receiving a first set of stream-based data from a first asset disposed at a first location in an industrial system configured to perform one or more operations, receiving a second set of stream-based data from a second asset disposed at a second location in the industrial system, identifying a first portion of the first set of stream-based data and a second portion of the second set of stream-based data, wherein the first portion and the second portion comprises a same type of data, determining whether the first portion of the first set of stream-based data corresponds to an expected range of values based on the second portion of the second set of stream-based data, and sending a command to the first asset to adjust a first set of operations in response to the first portion of the first set of stream-based data not being within the expected range of values.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
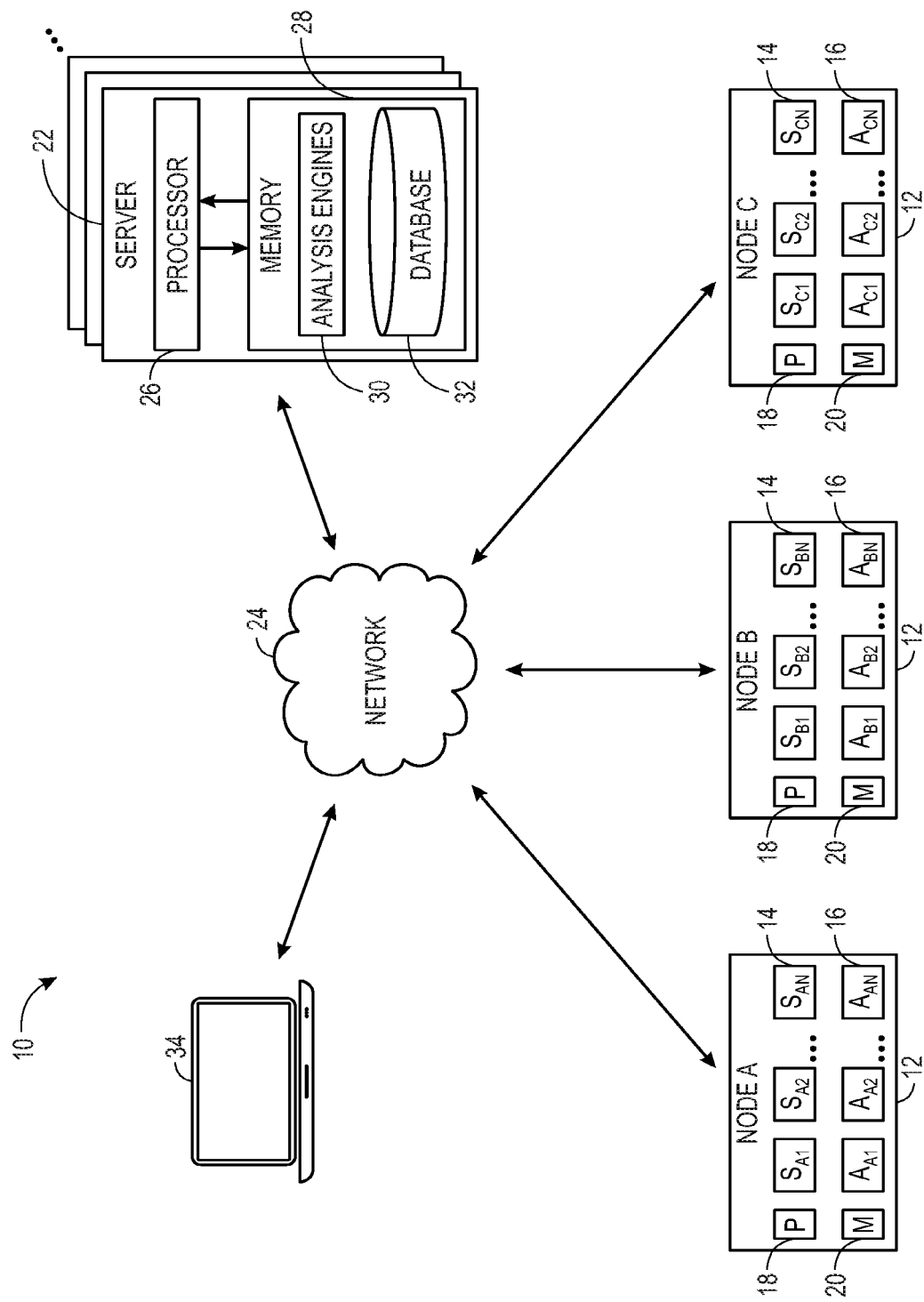
FIG. 1 illustrates a block diagram of a high-level overview of stream-based processing analysis system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards systems and methods for providing improved control of one or more assets in a multi-node network using stream-based processing. An industrial process may include a series of steps performed by a collection of respective components or assets disposed at nodes. Sensors disposed at each node may collect data, which a control system of the asset may compare to preset threshold values or ranges. The control system may then take one or more predetermined actions based on whether or not the collected data exceed the threshold values and/or fall within the preset ranges. Accordingly, the control system of each asset may not take into account the state of the other assets within the network working in concert to perform the industrial process when controlling the component in real time or near real time. Further, the control system of each component may not take into account an underlying condition of the industrial process or a holistic view of some or all of the other components working in concert to perform the industrial process when controlling the component. This may result in the industrial process working in an inefficient or otherwise undesirable state.

To obtain a holistic view of the industrial process, an operator of the industrial process may hire a subject matter expert (SME) to perform an in-depth analysis of the industrial process. For example, the operator may collect data from the various nodes of the network for the industrial process over the course of a few weeks or months and then send the data to the SME for analysis. Based on the analysis of the SME, the operator may make adjustments to the industrial process. In the interim, the industrial process may run for weeks or months in an inefficient or undesirable state between collection of the data and the adjustments made upon receiving the results of the analysis provided by the SME.

With this is mind, the disclosed techniques include receiving streams of data from multiple nodes within the network, using the data received via the data streams to model one or more underlying conditions in real time or near real time (e.g., within seconds or minutes) using data received from the various streams as inputs, and then determine what, if anything, should be done to control one or more of the assets within the network to make the industrial process run more efficiently. The analysis may include, for example, using one or more analysis engines to maintain one or more models (e.g., state-based models) of various aspects of the industrial process, running scripts or routines on the received data, performing queries based on the data, updating an analysis function, applying fuzzy logic, consulting one or more truth tables, and so forth to analyze the received data in real time or near real time. In some embodiments, the received data may be cleansed or preprocessed to check for frozen data, transform units, identify data types, provide relevant data to the appropriate analysis engines, etc. Based on the underlying condition, decision tables may be referenced to determine what, if any, remedial action to recommend. In some embodiments, the recommended action may be automatically taken. In other embodiments, the recommended action may be recommended to a user for approval before the action is taken. In further embodiments, the recommended action may be recommended for the user to implement on his or her own. In yet further embodiments, the recommended action may be added to a workflow (e.g., a business workflow) and/or to a user's to do list. Accordingly, the disclosed techniques provide real time or near real time feedback for one or more assets within a multi-node network based on a holistic model of the network generated using streams of data provided by multiple nodes.

By way of introduction, FIG. 1 illustrates a high-level overview of a stream-based processing analysis system 10 for an enterprise. The analysis system 10 may include a plurality of nodes 12 disposed in the same or different industrial environments. The nodes 12 may be located geographically near one another (e.g., in the same industrial facility), located geographically remote from one another (e.g., located in different facilities, different cities, different states, different regions, different countries, different continents, etc.), or some combination thereof (e.g., two nodes 12 in one industrial facility, and a third node 12 at a different location hundreds of miles away). Further, the nodes 12 may be distributed horizontally along some production process (e.g., the nodes 12 include or are coupled to machines performing the same or similar steps in a process in parallel), distributed vertically along some production process (e.g., the nodes 12 include or are coupled to machines performing different steps of a process in series), or some combination thereof. Accordingly, one or more of the nodes 12 may be situated upstream or downstream from one or more other nodes 12. In other embodiments, the nodes 12 may be part of different, but in some cases, related processes. For example, in one embodiment related to oil and gas extraction, the nodes 12 may be various wells extracting hydrocarbons from the same reservoir or hydrocarbon deposit. In a second embodiment related to oil and gas, the nodes 12 may be correspond with steps along the process of extraction and processing (e.g., extraction, separation, transport, storage, decanting, refining, etc.).

As shown, each node 12 may include one or more sensors 14 and/or one or more actuators 16. The sensors 14 may sense one or more parameters (e.g., temperature, pressure, flow rate, etc.) and provide a stream of measurements for the one or more parameters. The actuators 16 may be configured to move in response to a control signal to adjust one or more properties at one or more nodes 12 or to perform one or more tasks at one or more of the nodes 12. In some embodiments, one or more of the nodes 12 may include a hardware processor 18 and a memory component 20. The processor 18 and memory component 20 may represent a computing device coupled to the node 12, a control system for the node 12, a user interface for the node 12, or some combination thereof. The memory component 20 may store data collected by the sensors 14, code to be executed by the processor 18, and so forth. The processor 18 may be configured to execute instructions stored on the memory component 20. For example, the processor 18 may be configured to perform some analysis (e.g., pre-processing) on data collected by the sensors 14. In other embodiments, the processor 18 may analyze the data collected by the sensors 14 and generate control signals for the actuators 16. The processor 18 may also facilitate communication between the nodes 12 and various other components within the analysis system 10.

The nodes 12 may include one or more industrial devices or assets that make up automation systems operating within respective facilities. Exemplary automation systems may include, but are not limited to, batch control systems (e.g., mixing systems), continuous control systems (e.g., proportional-integral-derivative (PID) control systems), or discrete control systems. In such embodiments, the nodes 12 may also include devices, such as industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers and readers, vision system devices (e.g., vision cameras), smart welders, or other such industrial devices. Further, it should be understood that the nodes 12 may be disposed within fixed-location industrial facilities, or the nodes 12 may be part of a mobile control application, such as a system contained in a truck or other service vehicle.

As shown, the nodes 12 may be in communication with one or more servers 22 via a network 24 (e.g., the internet). A communication link between the nodes 12 and the network 24 may be a wired or a wireless connection, such as Wi-Fi®, Bluetooth®, and the like. Each of the servers 22 may include a hardware processor 26 and a memory component 28 accessible by the processor 26. The memory component 28 may store, for example, instructions to be executed by the processor 26, one or more analysis engines 30, scripts, or routines to be applied by the processor 26, and a database 32. The database 32 may store historical data, training data, results of analysis, etc. As shown, the server 22 may receive streams of data from multiple nodes 12 and analyze sets of stream-based data received from the data streams in real time or near real time (e.g., within seconds or minutes). The processor 26 may run scripts or models stored in the memory 28 to analyze incoming data. In some embodiments, historical data, training data, or other data stored in the database 32 may be used to provide context to analysis of incoming data or may be used as training data for training a machine learning model. The processor 26 may determine recommended actions, generate control signals for implementing recommended actions, generate notifications, generate visualizations, etc. Although various processes described herein are detailed as being performed by the server 22, it should be noted that any suitable computing device (e.g., node 12, processor 18) may also be used to perform the techniques described herein.

FIG. 1 shows a plurality of servers 22. In some embodiments data received from the nodes 12 may be sent to one or more specific servers 22 for analysis based on the type of the data, the source of the data (e.g., the model number and/or manufacturer of the device or asset), or some other characteristic of the data. In other embodiments, the data analysis may be cloud-based. That is, data analysis functions may be distributed over a plurality of servers 22.

As discussed in more detail below, the nodes 12 may collect data and then provide streams of data (e.g., data sent in real time or near real time) to the one or more servers 22 via the network 24. The one or more servers 22 may then then clean, preprocess, or filter noise from the data in the data stream (e.g., perform some preprocessing functions, such as identify the data type, filter data, check for frozen data, confirm that values are in expected ranges, transform units, send to a specific analysis engine, etc.). The analysis engines 30 on the server 22 may then perform analysis (e.g., run a model, run a script, perform fuzzy logic calculations, etc.) in real time or near real time (e.g., analysis is completed in seconds or minutes), and then either automatically take action or propose a recommended action to be provided to a user for approval.

In some embodiments, the stream-based analysis system 10 may also include a computing device 34 connected to the nodes 12 and/or the one or more servers 22 via the network 24 or directly (not shown). The computing device 34 may review the analysis, review and/or approve recommended actions, set or modify parameters for analysis, view data from the nodes 12, control various aspects of the nodes 12, etc. Generally, the computing device 34 may be any type of processing device that may include communication abilities, processing abilities, and the like. For example, the computing device 34 may be a controller, such as a programmable logic controller (PLC), a programmable automation controller (PAC), or any other controller that may monitor, control, and operate the industrial device. The computing device 34 may be incorporated into any physical device (e.g., the industrial device) or may be implemented as a stand-alone computing device (e.g., general purpose computer), such as a desktop computer, a laptop computer, a tablet computer, a mobile computing device, or the like. The computing device 34 may provide a graphical user interface (e.g., a browser, an application, etc.) by which a user may monitor and control various aspects of the analysis system 10.

Figure 2:
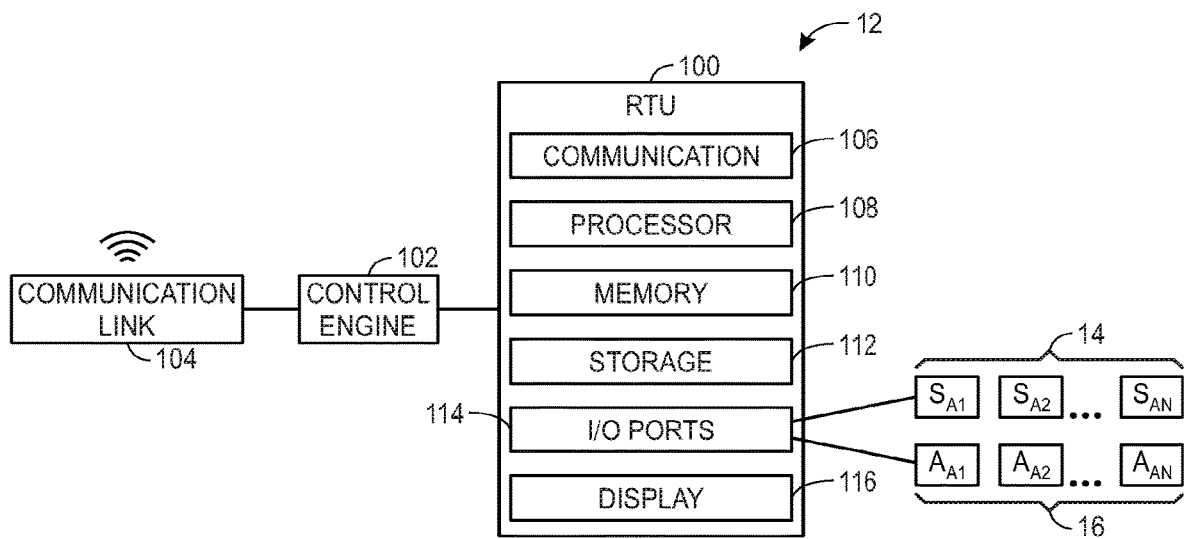
FIG. 2 illustrates a block diagram of a remote terminal unit (RTU) that may be employed in the stream-based processing analysis system of FIG. 1, in accordance with embodiments presented herein.

FIG. 2 is a schematic view of an embodiment of one of the nodes 12 of FIG. 1. As shown, in the illustrated embodiment, the node 12 includes a remote terminal unit (RTU) 100, a control engine 102, and a communication link 104. The RTU 100 may include sensors 14 or may be coupled to various sensors 14 that may monitor various properties associated with a component at an industrial site. The RTU 100 may then analyze the various properties associated with the component and may control various operational parameters of the component. For example, the RTU 100 may measure a pressure or a differential pressure of a well or a component at the industrial site. The RTU 100 may also measure temperatures of contents stored inside a component at the industrial site, an amount of hydrocarbons being processed or extracted by components at the industrial site, and the like. The RTU 100 may also measure a level or amount of hydrocarbons stored in a component, such as a storage tank. In certain embodiments, the RTU 100 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by Rockwell Automation.

In one embodiment, the RTU 100 may include a sensor 14 that may measure pressure, temperature, fill level, flow rates, and the like. The RTU 100 may also include communication component 106 or a transmitter, such as a radio wave transmitter, that may transmit data acquired by the sensor 14 via an antenna or the like. The sensor 14 in the RTU 100 may be a wireless sensor that may be capable of receiving and sending data signals between RTUs 100. To power the sensors 14 and the transmitters, the RTU 100 may include a battery or may be coupled to a continuous power supply. Since the RTU 100 may be installed in harsh outdoor and/or explosion-hazardous environments, the RTU 100 may be enclosed in an explosion-proof container that may meet certain standards established by the National Electrical Manufacturer Association (NEMA) and the like, such as a NEMA 4X container, a NEMA 7X container, and the like.

The RTU 100 may transmit data acquired by the sensor 14 or data processed by a processor 108 to other monitoring systems, a router device, a supervisory control and data acquisition (SCADA) device, or the like. As such, the RTU 100 may enable users to monitor various properties of various components in the industrial site without being physically located near the corresponding components.

In operation, the RTU 100 may receive real-time or near real-time data associated with the associated component case head pressure, flowline pressure, wellhead pressure, wellhead temperature, and the like. In any case, the RTU 100 may analyze the real-time data with respect to static data that may be stored in a memory 110 of the RTU 100. The static data may include a well depth, a tubing length, a tubing size, a choke size, a reservoir pressure, a bottom hole temperature, well test data, fluid properties of the hydrocarbons being extracted, and the like. The RTU 100 may also analyze the real-time data with respect to other data acquired by various types of instruments (e.g., water cut meter, multi-phase meter) to determine an inflow performance relationship (IPR) curve, a desired operating point for a wellhead, key performance indicators (KPIs) associated with the wellhead, wellhead performance summary reports, and the like. Although the RTU 100 may be capable of performing the above-referenced analyses, the RTU 100 may not be capable of performing the analyses in a timely manner. Moreover, by just relying on the processor capabilities of the RTU 100, the RTU 100 may be limited in the amount and types of analyses that it may perform. Moreover, since the RTU 100 may be limited in size, the data storage abilities may also be limited.

Keeping the foregoing in mind, in certain embodiments, the RTU 100 may establish a communication link 104 with the stream-based processing analysis system 10 shown in FIG. 1. As such, the stream-based processing analysis system 10 may use its larger processing capabilities to analyze data acquired by multiple RTUs 100. Moreover, the stream-based processing analysis system 10 may access historical data associated with the respective RTU 100, data associated with well devices associated with the respective RTU 100, data associated with the industrial site associated with the respective RTU 100 and the like to further analyze the data acquired by the RTU 100.

Accordingly, in one embodiment, the RTU 100 may communicatively couple to the stream-based processing analysis system 10 via the communication link 104 shown in FIG. 2. The RTU 100 may communicatively couple to the control engine 102 such as ControlLogix® or the like. The control engine 102 may, in turn, communicatively couple to the communication link 104 that may provide a protocol or specifications such as OPC Data Access that may enable the control engine 102 and the RTU 100 to continuously communicate its data to the stream-based processing analysis system. The communication link 104 may be communicatively coupled to the stream-based processing analysis system 10. Although the RTU 100 is described as communicating with the stream-based processing analysis system 10 via the control engine 102 and the communication link 104, it should be noted that in some embodiments, the RTU 100 may communicate directly with the stream-based processing analysis system 10.

In some embodiments, the RTU 100 may communicatively couple to the control engine 102 or the communication link 104 via an Ethernet IP/Modbus network. As such, a polling engine may connect to the RTU 100 via the Ethernet IP/Modbus network to poll the data acquired by the RTU 100. The polling engine may then use an Ethernet network to connect to the stream-based processing analysis system.

As mentioned above, the RTU 100 may monitor and control various types of industrial components (e.g., oil and gas well devices) and may send the data acquired by the respective components to the stream-based processing analysis system 10 according to the architecture described above. For example, the RTU 100 may monitor and control an electrical submersible pump (ESP), a gas lift (GL), a rod pump controller (RPC), a progressive cavity pump (PCP), and the like. In the ESP, the RTU 100 may sense and control the wellhead and other operating variables of the ESP system. In the GL, the RTU 100 may adjust a gas lift injection flow to operator flow rate, compute real-time estimated gas-oil-water production, and the like. In the RPC, the RTU 100 may provide advance rod pump controlling operations for beam pump applications and the like. The RTU 100 may also monitor both polish rod load and continuous walking beam position to develop dynamometer cards. In the PCP, the RTU 100 may provide local and remote monitoring of the wellhead and other PCP variable. Here, the RTU 100 may also perform basic analysis and adjust the pumping conditions of the PCP based on the received data from the PCP.

As shown in FIG. 2, the RTU 46 may include the communication component 106, the processor 108, the memory 110, a storage 112, input/output (I/O) ports 114, a display 116, and the like. The communication component 106 may be a wireless or wired communication component that may facilitate communication between different RTUs 100, gateway communication devices, various control systems, and the like. The processor 108 may be any type of computer processor or microprocessor capable of executing computer-executable code. The memory 110 and the storage 112 may be any suitable articles of manufacture that can serve as media to store processor-executable code, data, or the like. These articles of manufacture may represent computer-readable media (i.e., any suitable form of memory or storage) that may store the processor-executable code used by the processor 108 to perform the presently disclosed techniques. The memory 110 and the storage 112 may also be used to store data received via the I/O ports 114, data analyzed by the processor 108, or the like.

The I/O ports 114 may be interfaces that may couple to various types of I/O modules such as sensors 14, actuators 16, programmable logic controllers (PLC), and other types of equipment. For example, the I/O ports 114 may serve as an interface to pressure sensors, flow sensors, temperature sensors, and the like. As such, the RTU 100 may receive data associated with a well via the I/O ports 114. The I/O ports 114 may also serve as an interface to enable the RTU 100 to connect and communicate with surface instrumentation, flow meters, water cut meters, multiphase meters, and the like.

In addition to receiving data via the I/O ports 114, the RTU 100 may control various devices via the I/O ports 114. For example, the RTU 100 may be communicatively coupled to the actuator 16 or motor that may modify the size of a choke that may be part of the well. The choke may control a fluid flow rate of the hydrocarbons being extracted at the well or a downstream system pressure within the network of pipelines or the like. In one embodiment, the choke may be an adjustable choke that may receive commands from the RTU 100 to change the fluid flow and pressure parameters at the well.

The display 116 may include any type of electronic display such as a liquid crystal display, a light-emitting-diode display, and the like. As such, data acquired via the I/O ports and/or data analyzed by the processor 108 may be presented on the display 116, such that operators having access to the RTU 100 may view the acquired data or analyzed data at the hydrocarbon well site. In certain embodiments, the display 116 may be a touch screen display or any other type of display capable of receiving inputs from the operator.

In addition to employing the RTU 100 to analyze data associated with a component at an industrial site (e.g., a well, a well device, etc.), the RTU 46 may also, as discussed above, receive analyzed data from the stream-based processing analysis system 10. Moreover, the computing device 34 shown in FIG. 1 may also receive the same analyzed data from the stream-based processing analysis system, thereby providing the operator the opportunity to interpret the analyzed data and modify the operating parameters of the associated industrial equipment. Moreover, since the stream-based processing analysis system 10 may have access to additional data sources and may have more processing power as compared to the RTU 100, the operator may have access to more accurate analysis to further increase the efficiency of the operations of the industrial equipment.

Figure 3:
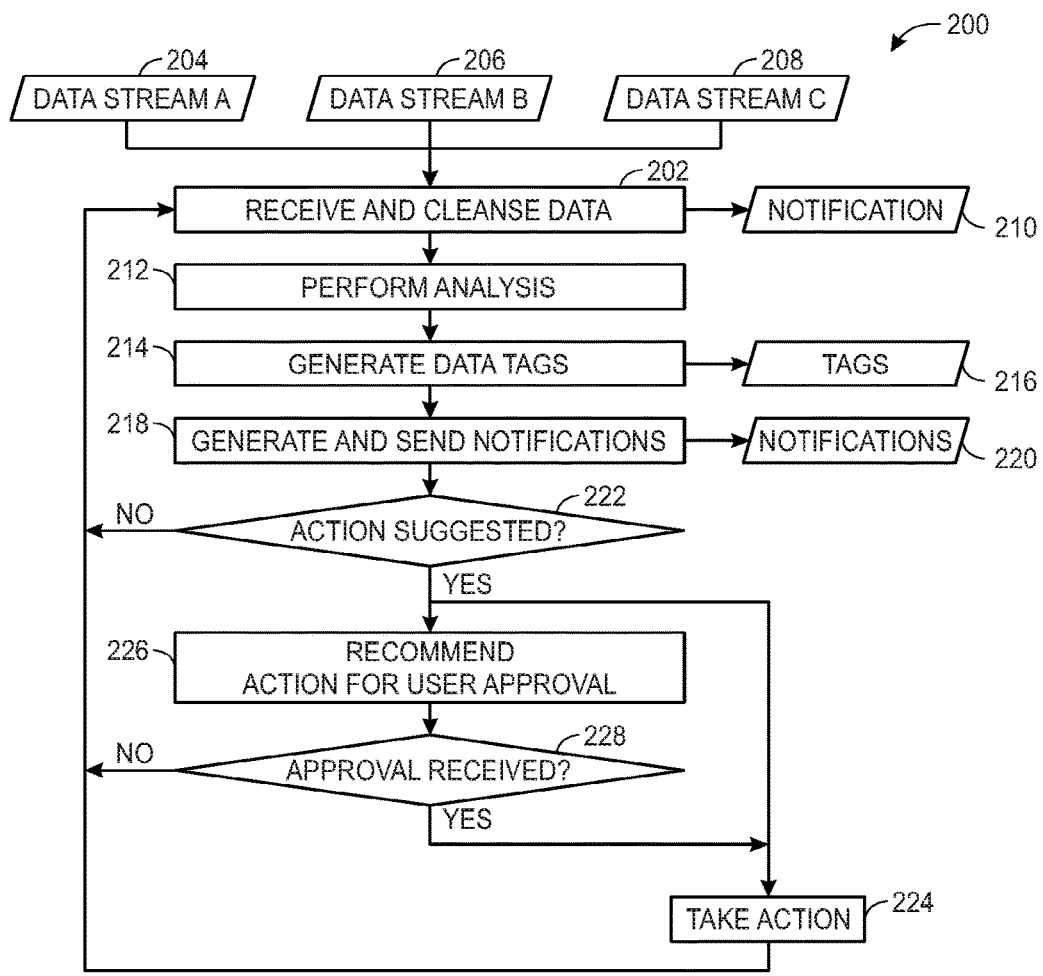
FIG. 3 illustrates a flow chart of a process for stream-based processing analysis, in accordance with embodiments presented herein.

FIG. 3 is a flow chart of a process 200 for controlling an asset (e.g., an industrial component) using the stream-based processing analysis system 10 shown in FIG. 1. In the instant embodiment, the process 200 is performed by one of the servers 22 shown in FIG. 1. However, it should be understood that performance of the process 200 may be distributed over multiple servers 22 within the stream-based processing analysis system 10. Further, in some embodiments, the process 200 may be performed by any computing device (e.g., the computing device 34 shown in FIG. 1, or a computing device associated with one or more of the nodes 12, such as the RTU 100 or the control engine 102 shown in FIG. 2) or other suitable component within the stream-based processing analysis system 10. At block 202, data streams 204, 206, 208 are received by the server from various respective nodes 12 and cleansed or otherwise pre-processed. As previous described, rather than being received in batches, data is transmitted in real time or near-real time as it is sensed at the node, resulting in streams of data 204, 206, 208 from the nodes to the one or more servers 22. Cleansing the data, which is described in more detail with regard to FIG. 4, may include, preprocessing the data streams 204, 206, 208 and providing data from the data streams 204, 206, 208 to the appropriate analysis engines. Preprocessing may include, for example, checking for frozen data, transforming the units of the data, identifying the type of data (e.g., temperature, pressure, flow rate, etc.), confirming that data values are within an expected range, generating and transmitting notifications 210 if there are any issues with the data, and determining the appropriate analysis engine. If all of the data streams 204, 206, 208 were provided to each analysis engine, each analysis engine would then have to sift through a large amount of irrelevant data and isolate the relevant data for performing its assigned task (e.g., modeling the pressure dynamics of a hydrocarbon reservoir or deposit), thus hindering the analysis engine's ability to perform analysis in real time or near real time. Accordingly, the efficiency of the stream-based processing analysis system 10 may be improved by identifying data received via the data streams 204, 206, 208 providing the data to the appropriate analysis engines for analysis.

At block 212, the one or more analysis engines may perform analysis based on the data received via the data streams 204, 206, 208 in real time or near real time (e.g., in seconds or minutes). Rather than comparing a single value to some pre-set threshold value and then generating alerts or implementing some kind of control based on whether or not the value in question exceeds the threshold value, the instant techniques utilize data from multiple sources to gain a more complete understanding of the underlying state or condition and then determine what, if any, adjustments should be made. In some embodiments, the analysis may include comparing data of the same type received from different data streams 204, 206, 208, updating a model (e.g., a state-based model) with multiple inputs, running scripts on the data, performing queries based on the data, updating an analysis function, applying fuzzy logic, consulting one or more truth tables, and so forth. The analysis engines may be set up to model a broad aspect of an industrial system (e.g., output of a manufacturing system) based on a large number of inputs, a specific aspect of an industrial system (e.g., pressure of a reservoir or a temperature at a location of a manufacturing process), or anywhere in between. As previously discussed, the nodes that provide the data streams 204, 206, 208 may be located geographically near one another (e.g., in the same industrial facility), located geographically remote from one another (e.g., located in different facilities), or some combination thereof. Further, the nodes may be distributed horizontally along some production process (e.g., the nodes include or are coupled to machines performing the same or similar steps in a process in parallel), distributed vertically along some production process (e.g., the nodes include or are coupled to machines performing different steps of a process in series), or some combination thereof. Accordingly, one or more of the nodes may be situated upstream or downstream from one or more other nodes. In such an embodiment, the data provided by the upstream node or nodes may be used as inputs to a model to generate expected values for the downstream node or nodes, to which the data received from the downstream nodes may be compared. In other embodiments, the nodes may be part of different, but in some cases, related processes. For example, in one embodiment related to oil and gas extraction, the nodes may be various wells extracting hydrocarbons from the same reservoir or hydrocarbon deposit. In such an embodiment, the data provided from one node may be compared to data provided by one or more other nodes. In a second embodiment related to oil and gas, the nodes 12 may be correspond with steps along the process of extraction and processing (e.g., extraction, separation, transport, storage, decanting, refining, etc.).

Data from the data streams 204, 206, 208 may be used to generate a model of the underlying condition of a system or update an existing model of the underlying condition of the system or systems in question and then make determinations as to what, if anything, should be done to make adjustments to the system or systems in question. Accordingly, as data is collected over time and the behavior of the underlying system is monitored as the system undergoes a wider range of conditions, the model of the system may adapt and become more robust and sophisticated.

Along these lines, in some embodiments, as data is collected, some or all of the data may be added to a database of historical data and used to fine tune the model. If only some of the data is stored in the database as historical data, decisions as to what data should be stored in the database may be made automatically or by a human expert. For example, when the system undergoes conditions that are unusual or otherwise noteworthy, a decision may be made to store data from before, during, and/or after that condition in the database. In some embodiments, the historical data in the database may be used to train a machine learning algorithm. The machine learning algorithm may then be used to develop a model used to analyze the data streams 204, 206, 208, or the machine learning algorithm may analyze the data streams 204, 206, 208 itself to determine the underlying condition.

In some embodiments, the data received via the data streams 204, 206, 208 may be accompanied by metadata (e.g., tags) or have metadata embedded in the data that may identify one or more characteristics of the data (e.g., the type of data, the measured parameter, the source of the data, the location of the data, offset values, calibration data, etc.) that may provide some context for the data and/or help sort the data upon receipt. If data is added the database of historical data, tags may also be used include information about the conditions when the data was collected. In some embodiments, received data may not include tags, or may include tags that are incomplete or incorrect. In such an embodiment, at block 214, new tags 216 may be generated and added to the data as though the tags 216 had been generated at the node. The new tags 216 may be added to data that was received without tags, may supplement incomplete tags that were received with the data, or may replace incorrect tags received with the data.

At block 218, notifications 220 may be generated based on the analysis performed at block 212 and transmitted for review. In some embodiments, the notifications may include reports and/or visualizations as to the underlying condition of the system or systems in question, as determined during the analysis performed at block 212. The notifications 220 may also include alerts or alarms configured to inform a user that one or more specific conditions are present. For example, a notification 220 may inform a user that a part of component is malfunctioning, at risk of failure, or has broken. In other embodiments, the notification 220 may inform a user that a pressure, temperature, flow rate, etc. is too low or too high, etc.

At decision block 222, the server determines whether or not to suggest an action. In most cases, analysis performed at block 212 will determine that the system or systems are performing as expected and that no action is recommended. In such a case, the server may return to block 202 and cleanse new data received from the data streams 204, 206, 208. However, in some cases, the analysis performed at block 212 may determine that the underlying system or systems are not running according to some threshold (e.g., output efficiency, power efficiency) and that some adjustment may improve operation. In such a case, server may apply the underlying condition determined during the analysis performed at block 212 to one or more decision tables in order to determine what action, if any, should be taken to improve operation. For example, the recommended action may include adjusting a valve, adjusting the speed of a rotating motor, adjusting a heater, adjusting a pump pressure etc.

In some embodiments, the server may be pre-approved to automatically take any recommended action, or to automatically take a recommended action from an approved list of actions. For example, in some embodiments, the server may be pre-approved to adjust the temperature of a heater, a pump pressure, a position of a valve, or a speed of a rotating motor within some pre-set range of values. Accordingly, at block 224, the server may automatically take the recommended action without requesting user approval. For example, the server may generate a control signal or a command adjusting one or more properties for one or more assets disposed at respective nodes. The server may then return to 202 and cleanse new data received from the data streams 204, 206, 208.

However, certain actions may request user approval before implementing. In such embodiments, at block 226, the server may recommend an action to be taken. For example, a notification recommending the action may be provided to a user via a graphical user interface of a computing device. The user may then acknowledge the recommendation and implement the recommended action or decline to implement the recommended action. In some embodiments, the server may execute the recommended action (block 224) upon determining that approval for the recommended action has been received (block 228). In some embodiments, the action may include sending a command or signal to an actuator or other component to adjust its operation (e.g., speed, temperature). In other embodiments, the user may take action to implement the recommended action. The server may then return to 202 and cleanse new data received from the data streams 204, 206, 208.

Figure 4:
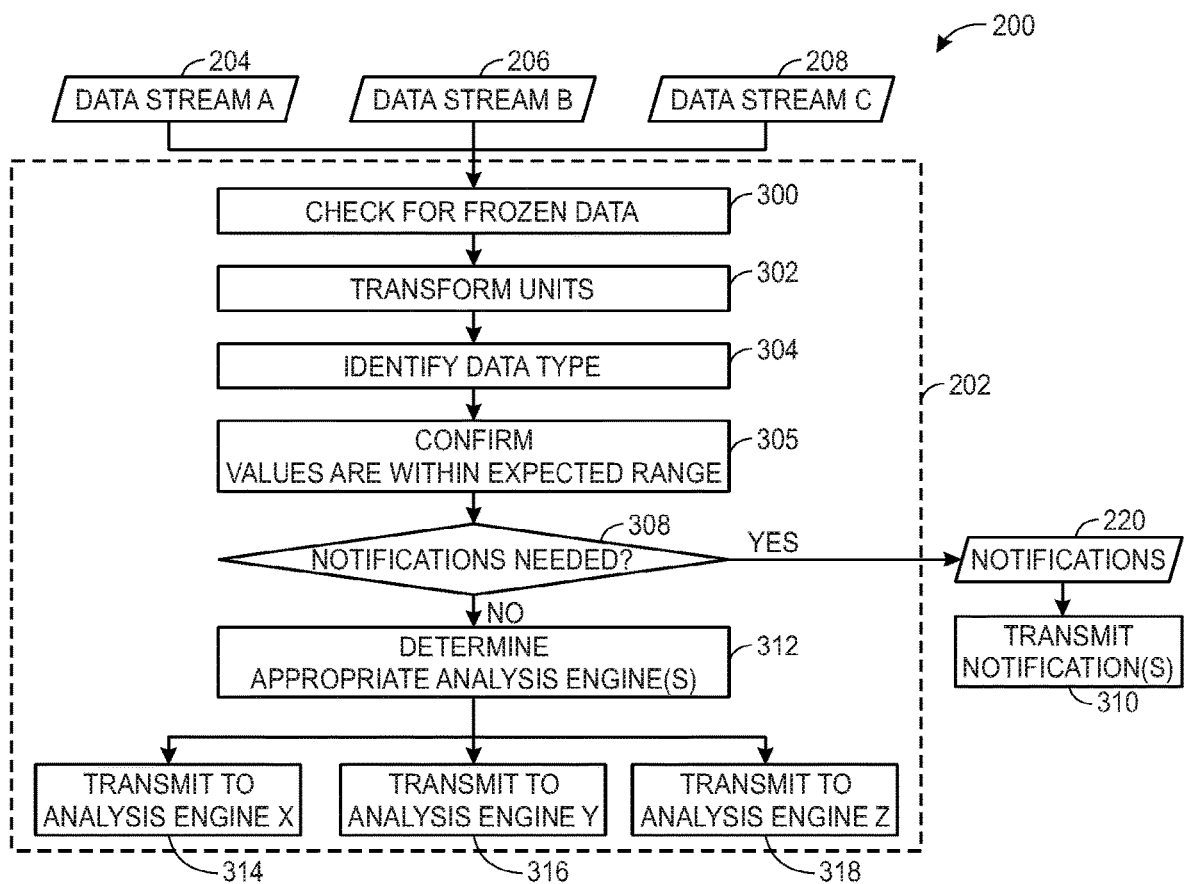
FIG. 4 illustrates a flow chart of a process for cleansing data within the stream-based processing analysis system of FIG. 1, in accordance with embodiments presented herein.

FIG. 4 is a flow chart expanding the receive and cleanse data block (block 202) into a sub-process 202. At block 300, the server performs a frozen data check for the data received from the data streams 204, 206, 208. For example, the server may monitor data received via the data streams 204, 206, 208 and determine if a data field remains constant at a value for more than some threshold amount of time. For example, if a measured pressure or flow rate stays at the same value for more than 10 minutes, it may be indicative of a problem with the sensor. In other embodiments, the server may compare data of the same type pulled from multiple data streams 204, 206, 208. If the data from one stream does not move as expected with the other data streams 204, 206, 208, there may be a problem with the sensor, the asset, or the communication connection.

At block 302, the server may transform the data received via the data streams 204, 206, 208 into a desired unit value. In some embodiments, raw data may be received from the data streams 204, 206, 208 as it is received from the sensor (e.g., as an analog voltage or a digital signal). For example, temperature data collected by a thermocouple may arrive via one of the data streams 204, 206, 208 as an analog voltage signal. The server may then convert that signal into a desired unit value (e.g., degrees Fahrenheit, Centigrade, or Kelvin). In other embodiments, the node 12 may perform some processing of the signal output by the sensor 14 before providing it via one of the data streams 204, 206, 208. In such an embodiment, the server may convert the received data into a desired unit.

At block 304, the server identifies the data type of data received via the data streams 204, 206, 208. This may be referred to as type system analysis. As previously discussed, in some embodiments, the data received via the data streams 204, 206, 208 may include tags or other metadata that identify the type of data. If the data includes tags, the server may assume the data is of the type identified by the tags unless server has reason to believe the data is of a different type. In other embodiments, the server may analyze the values of the data, movement of the values over time, and other context to determine or infer the data type. Similarly, if the received data lacks tags, the server may analyze the values of the data, movement of the values over time, and other context to determine or infer the data type.

At block 306, the server may determine whether the values of the received data are within an expected range. For example, ranges for various values may be set and stored that indicate expected values for various data types. It should be understood, however, that these ranges are not defined based on particular operating conditions of the underlying system or systems, but based on expected readings by the sensors 14. That is, at this stage of the process 200, the server is attempting to determine if there is a problem with the sensor 14 and not whether there is a problem with the underlying system or systems. Accordingly, the expected value ranges applied at block 306 may be much wider than the expected ranges when the system or systems are running for certain operations. For example, data may be received from a temperature sensor coupled to a component intended to heat a liquid to 95 degrees Centigrade. Though the range of measured temperature values during one operation may range from 90 to 95 degrees Centigrade, the expected range of values associated with the health of the sensor for block 306 may be much wider, for example −250 to 500 Centigrade.

At decision block 308, the server may determine whether any notifications 220 are needed. If there is a problem with any of steps 300, 302, 304, and 306, the server may generate notifications 220 and transmit them to a user 310. That is, if the server determines that there is some problem with data received from the data streams 204, 206, 208, the server may generate a notification to let the user know of the problem before sending the data to one or more analysis engines for analysis. For example, if the server determines that the received data includes frozen data, the server is unable to transform the units of the data, the server is unable to identify the data type 304, or the some of the values of the received data fall outside of expected sensor ranges, the server may alert the use to a possible problem with the received data.

At block 312, the server determines the appropriate analysis engine or engines to which the received data should be sent. The appropriate analysis engine or engines may be determined based on data type, data source, time of collection, some other factor, or a combination thereof. As previously described, for a given system or systems, multiple analysis engines may be running in parallel to model different aspects of the system or systems. As such, in order to provide real time or near real time analysis, the analysis engines should only be provided with data that will be used to perform the analysis. Put another way, if all of the data received via the data streams 204, 206, 208 was provided to every analysis engine and each analysis engine was tasked with filtering out irrelevant data for the analysis the analysis engine is tasked with performing, for even somewhat complex systems, the analysis engines could become overloaded with data and unable to perform analysis in real time or near real time. The received data may then be separated and duplicated as needed and then transmitted to the appropriate analysis engine or engines (blocks 314, 316, 318).

It should be understood that though various steps of data cleansing are shown in FIG. 4 in a particular order, the order of steps, such as blocks 300, 302, 304, and 306 may be changed in some embodiments. Further, some embodiments of data cleansing may omit one or more of the blocks shown, or may add one or more additional steps. Further, in some embodiments, one or more of the actions in blocks 300, 302, 304, and 306 may be performed by the analysis engine rather than being performed before being provided to an analysis engine, as shown in FIG. 4.

Figure 5:
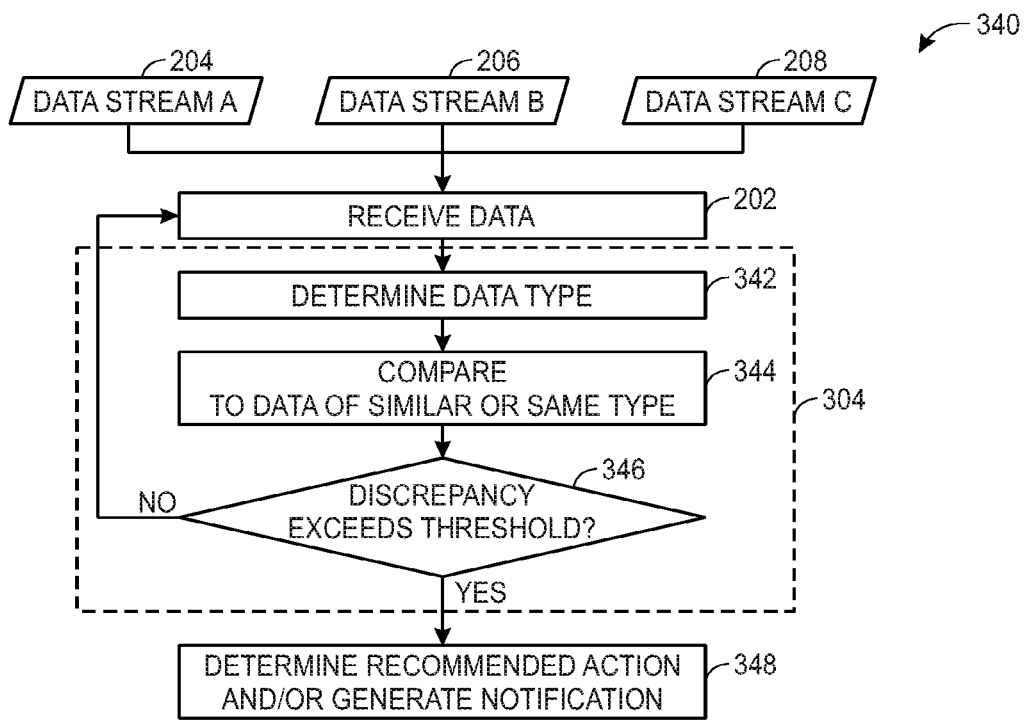
FIG. 5 illustrates a flow chart of a process for identifying data type within the stream-based processing analysis system of FIG. 1, in accordance with embodiments presented herein.

FIG. 5 is a flow chart of a process 340 that expands the identify data block 304 of FIG. 4 into a subprocess 304. As shown, data is received (block 202) from multiple data streams 204, 206, 208. At block 342, the server parses the data received from the various data streams 204, 206, 208 to group portions of data by type and identify the type of each portion of data. In some embodiments, the data streams 204, 206, 208 may include metadata that identifies the data type or some other characteristic that may be used as context to identify the data type (e.g., units, location where data was generated, source of the data, manufacturer, model, serial number of the asset that generated the data, protocol of transmission, etc.). In some embodiments, the server may be able to identify or infer the data type based on the values of the data and how the values change over time. For example, the server know based on the range of value received via a data stream and the rate of change in the values that the data likely corresponds to well pressure for an ESP well. In other embodiments, the server may compare data received via a data stream to data received via a different data stream of a known type or historical data of a known type to determine the type of data.

At block 344, once the data types for the various data streams 204, 206, 208 are known, the server may compare data received from the various data streams 204, 206, 208 that is determined to be of the same data type. Comparing data of the same type received from different data streams 204, 206, 208 allows the server to quickly and easily identify one or more nodes in a system that are experiencing a different condition from the other nodes in the system. For example, if one artificial lift device of a collection of artificial lift devices has a surface card that does not match the surface cards of the other artificial lift devices pumping from the same reservoir, the server may recognize this discrepancy more quickly by performing stream-based processing based on type. In some embodiments, when data is compared, the server may synchronize the data such that data of the same type from different data streams 204, 206, 208 may be compared at the same time, or at approximately the same time. In instances in which some event occurs that causes data values to change, synchronizing data from different data streams 204, 206, 208 may be useful in gaining a more complete understanding of what is taking place before, during, and/or after the event. In some embodiments, synchronizing the data may be done using timestamps that accompany the data, metadata, or based on known sampling rates. In other embodiments, changes in values associated with events that appear in multiple data streams 204, 206, 208 may be used to synchronize the data.

Comparing data of the same type from various data streams 204, 206, 208 may include comparing differences to raw threshold numbers, threshold percentages, standard deviations, and so forth. The thresholds may be manually set by a person, set algorithmically based on historical data, set by a machine learning algorithm, etc. At decision block 346, the server determines whether the difference in the data exceeds the threshold value or is outside of some acceptable range. If not, the server returns to block 202 and continues to receive data from the data streams 204, 206, 208. If yes, the server proceeds to block 348 and generates a notification and/or determines a recommended action to be taken at one or more of the nodes to return the industrial system to a more desirable operating condition. In some embodiments, the server may proceed to modify operation of one or more of the assets disposed at one or more of the nodes. In other embodiments, the server may recommend an action for approval by a user. In a further embodiment, the notification may be provided to the user informing the user that the data may not be correct, that an action is recommended, or that operation should be stopped.

Figure 6:
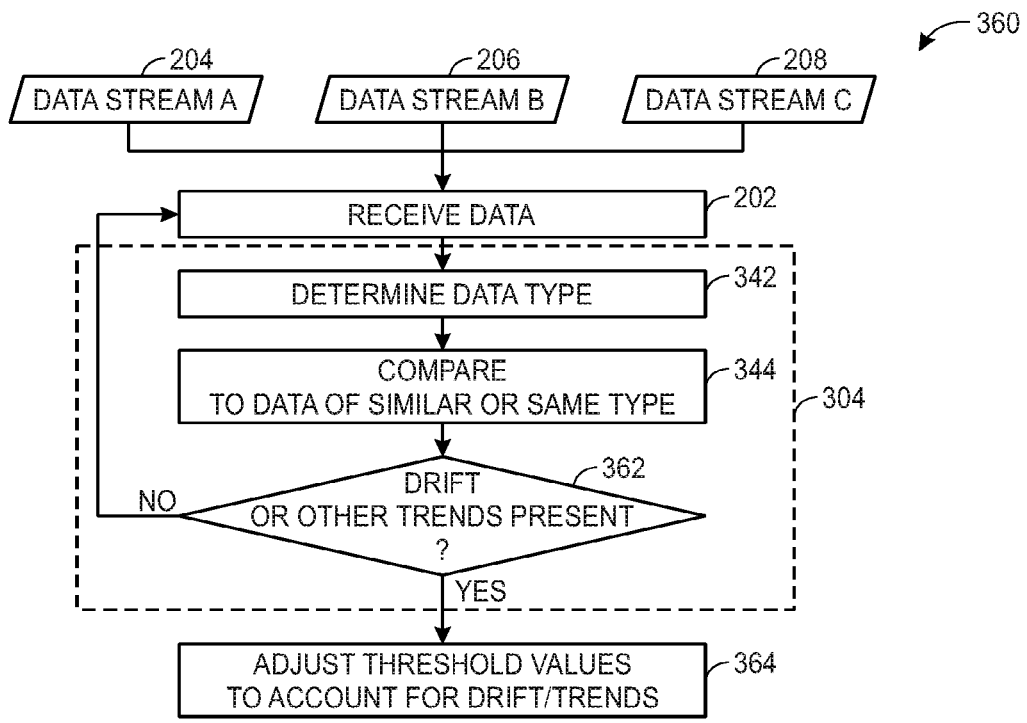
FIG. 6 illustrates a flow chart of a process for identifying drift and adjusting threshold values within the stream-based processing analysis system of FIG. 1, in accordance with embodiments presented herein.

FIG. 6 is a flow chart of a process 360 for identifying drift and adjusting threshold values. Data is received (block 202) from multiple data streams 204, 206, 208. At block 342, as previously described, the server parses data received from the various data streams 204, 206, 208 to group portions of data by type and identify the type of each portion of data. As previously described, identifying the type of a portion of data may include extracting and analyzing metadata, or using some other characteristic of the data as context to identify the data type (e.g., location where data was generated, source of the data, manufacturer, model, serial number of the asset that generated the data, etc.). If data type is not identified by metadata or other identifying characteristics, the server may be able to identify or infer the data type based on the values of the data and how the values change over time. In other embodiments, the server may compare data received via a data stream to data received via a different data stream of a known type or historical data of a known type to determine the type of data.

At block 344, once the data types for the various data streams 204, 206, 208 are known, the server may compare data received from the various data streams 204, 206, 208 that is determined to be of the same data type. Comparing data of the same type from various data streams 204, 206, 208 may include comparing differences to raw threshold numbers, threshold percentages, standard deviations, and so forth. The thresholds may be manually set by a person, set algorithmically based on historical data, set by a machine learning algorithm, etc. At decision block 362, the server determines of the data is drifting upward or downward, or if there are other notable data trends. In some embodiments, this determination may be made by comparing data from one or more data streams 204, 206, 208 to data from the other data streams 204, 206, 208 over time. In other embodiments, data from the data streams 204, 206, 208 may be compared to historical data (e.g., stored in a database) from the same or similar sources to identify drift or other trends. If drift or other trends are not present, the server returns to block 202 and receives data from the data streams 204, 206, 208. If drift or other trends are present, the server may adjust the threshold values (block 364) to account for the drift and/or data trends. In some embodiments, the server may run an analysis to confirm that the drift is not the result of a condition that should be addressed (e.g., a slow leak causing pressure to drift downward). If the drift is determined to not be indicative of a condition to be addressed, the server may model the drift over the sampled period and/or analyze historical data stored in a database to model the drift and determine where the new threshold values should be set. In some embodiments, fuzzy logic may be used in conjunction with one or more truth tables and one or more decision tables to determine the new threshold values. In other embodiments, historical data stored in a database may be used (e.g., by a machine learning algorithm) to set the new threshold values.

Returning to FIG. 3, in some embodiments, fuzzy logic may be used at block 212 in place of or in addition to quantitative data analysis. Fuzzy logic provides a nonanalytic alternative to traditional control theory. Specifically, based on a collection of states, an underlying condition may be determined. For example, rather than using one or more quantitative values (e.g., the temperature is 45 degrees Centigrade), a collection of states or qualitative observations (e.g., high/low, hot/cold, on/off, fast/slow, etc.) are used to determine an underlying condition. However, it should be understood that fuzzy logic may be used to analyze quantitative data received from sensors via the data streams 204, 206, 208. Indeed, use of fuzzy logic to analyze data received from sensors via the data streams 204, 206, 208 may be significantly less computationally resource intensive such that using fuzzy logic may be more efficient than quantitative data analysis. For example, for each data point received via the data streams 204, 206, 208, the value may be compared to a threshold value for that type of data to determine a state of each data point (e.g., high or low based whether the value is above or below the threshold value). The various states may then be plugged into one or more models and/or one or more truth tables to determine a degree of truth value for a plurality of different possible conditions, each indicating the likelihood that the condition is present.

Figure 7:
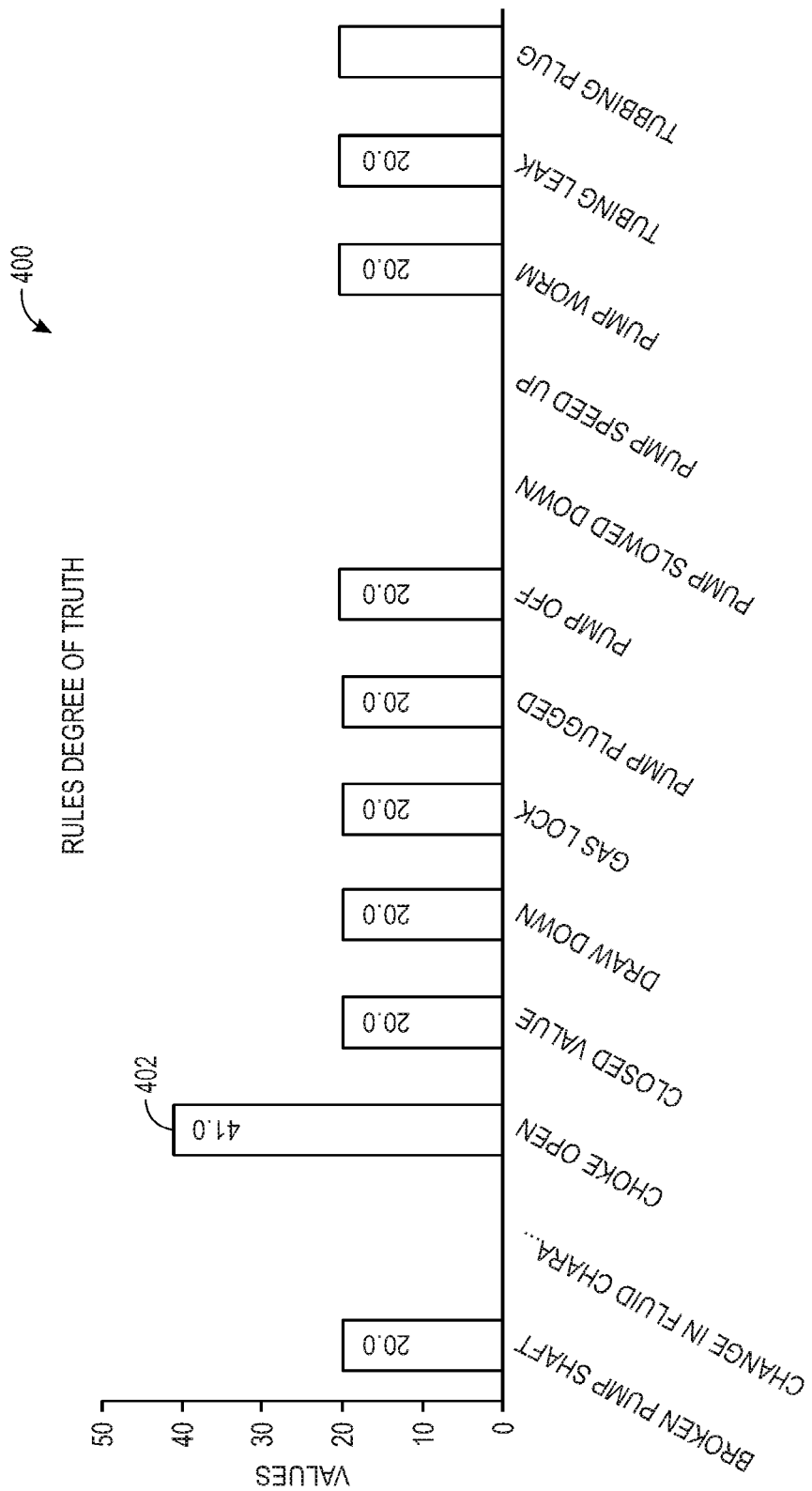
FIG. 7 illustrates a first bar graph visualization of degree of truth values for a number of conditions for an oil and gas well experiencing a problem, in accordance with embodiments presented herein.

For example, FIG. 7 is an embodiment of a first bar graph visualization 400 of degree of truth values for a number of conditions for an oil and gas well experiencing a problem. As previously described, sensor data may be collected from multiple sensors 14 disposed throughout the well. The sensor data may have been received in states or converted into states after being received. The states may then be input to one or more truth tables to determine degree of truth values to a range of possible conditions. As shown, the condition 402 with the highest degree of truth is "choke open" at a degree of truth value of 41.0. If the degree of truth value exceeds a set threshold, the analysis system may determine that the choke is likely open and consult a decision table to determine a recommended action. However, if the degree of truth value for each condition is below the set threshold, the analysis system may determine that the condition of the well cannot be determined at the time.

Figure 8:
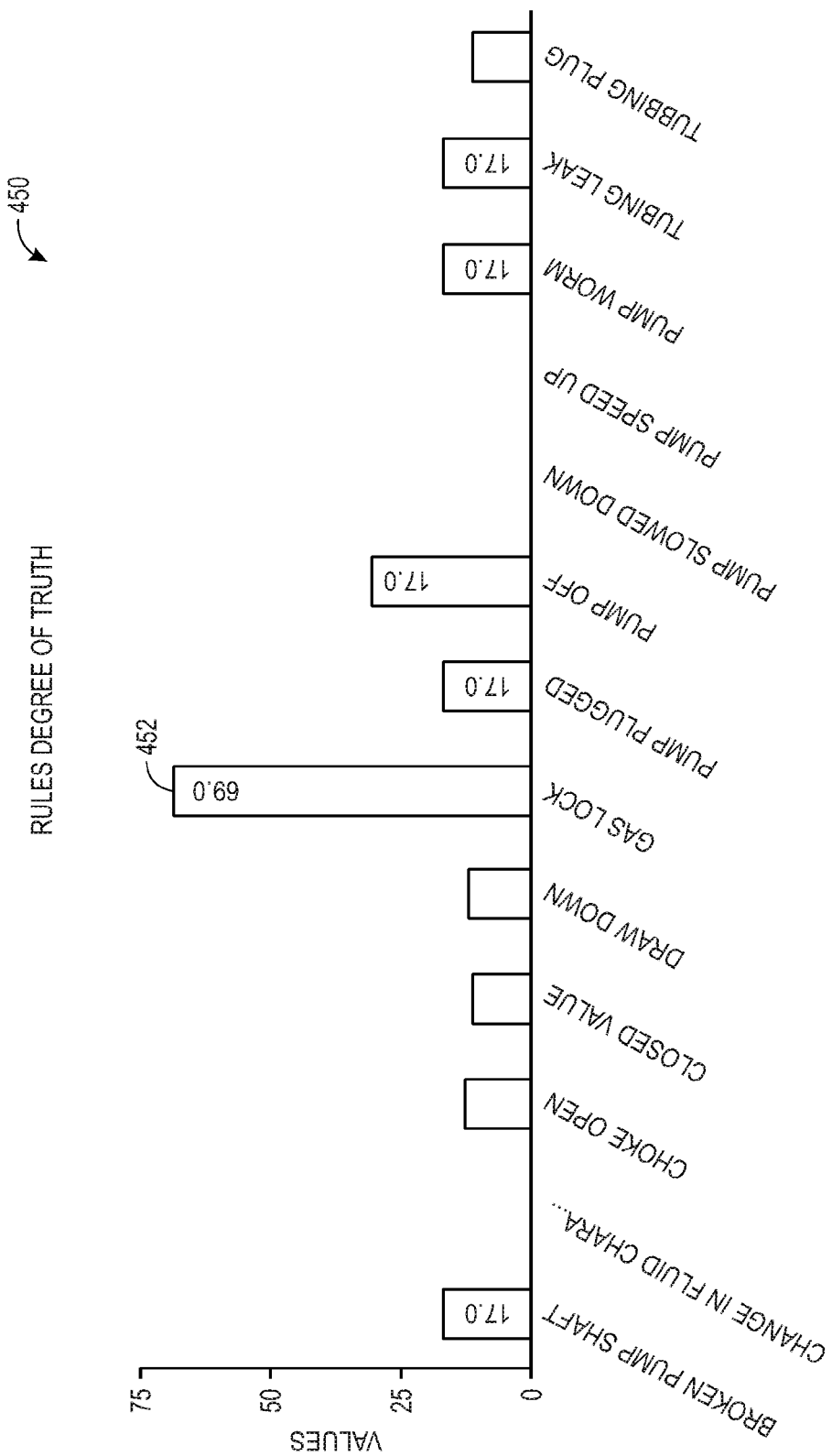
FIG. 8 illustrates a second bar graph visualization of degree of truth values for the number of conditions for the oil and gas well experiencing a different problem than that of FIG. 7, in accordance with embodiments presented herein.

FIG. 8 is an embodiment of a second bar graph visualization 450 of degree of truth values for the number of conditions for the oil and gas well experiencing a different problem. As shown, the condition 452 with the highest degree of truth is "gas lock" at a degree of truth value of 69.0. If the degree of truth value exceeds a set threshold, as is likely the case here, the analysis system may determine that a gas lock has likely occurred and consult a decision table to determine a recommended action.

Figure 9:
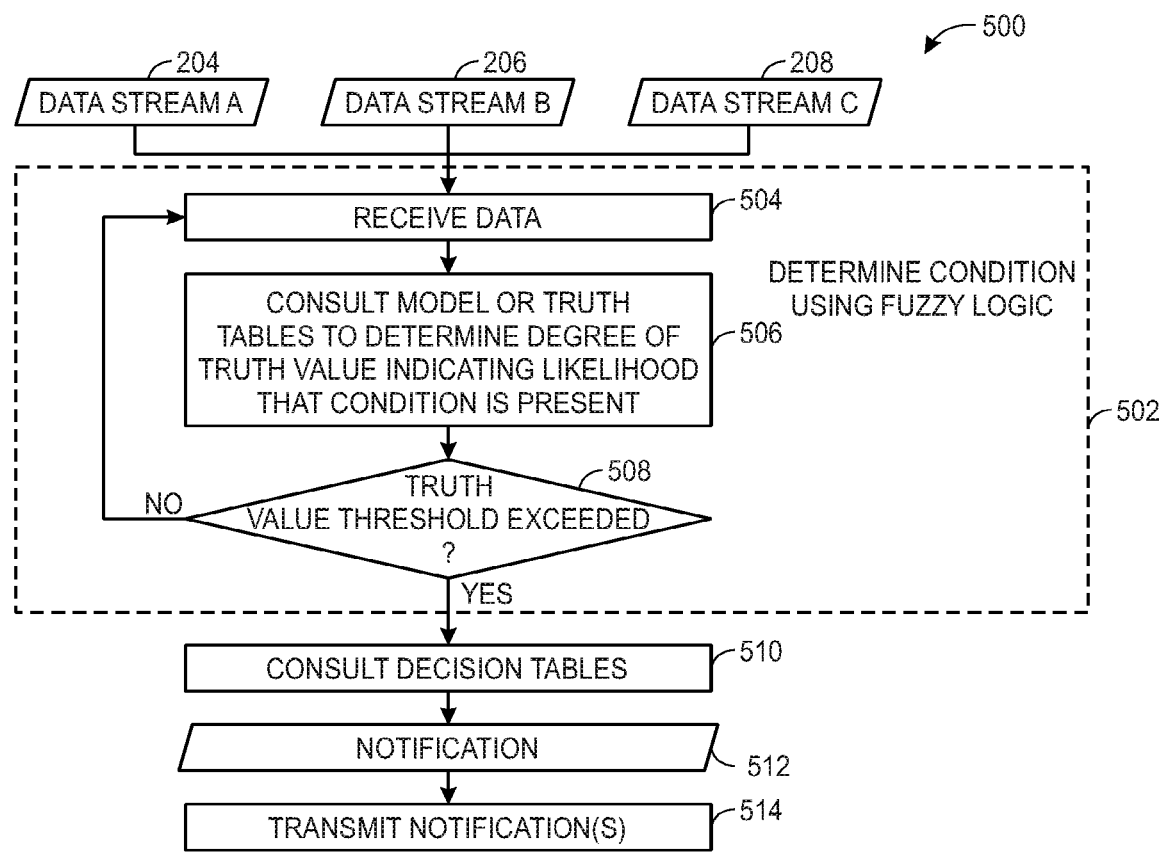
FIG. 9 illustrates a flow chart of a process for using fuzzy logic in the stream-based processing analysis system of FIG. 1, in accordance with embodiments presented herein.

FIG. 9 is a flow chart of a process 500 for using fuzzy logic in a stream-based processing analysis system 10. At block 504, states are received by the server via the data streams 204, 206, 208. As previously discussed, in some embodiments, quantitative data may be received via the data streams 204, 206, 208 and converted to states by comparing the quantitative data to one or more thresholds. At block 506, the states of multiple nodes are provided as inputs to one or more models and/or one or more truth tables to determine a degree of truth value for each of a plurality of possible conditions indicating the likelihood that the condition is present. Each of the truth tables may correspond to a component, a collection of components, a subsystem, a system, etc. of the industrial environment. The server may use fuzzy logic to analyze data from multiple data sources to understand the underlying condition of the system. For example, if a first asset provides a data stream indicating that pressure is high and a second asset, downstream from the first asset, provides a data stream indicating that the pressure is low, the server may use fuzzy logic to determine that there is a leak between the first asset and the second asset. In some embodiments, one or more of the truth tables may be multi-factor truth tables. That is, the server may recognize that the conditions of multiple operationally related assets may correlate to one another. Accordingly, the server may understand the correlation and recommend actions at, or send commands to, multiple assets when certain conditions are fond to be present. Similarly, the server may use fuzzy logic, machine learning, or other disclosed techniques to understand how different variables at the same or related assets correlate with one another or are otherwise related to one another. At decision block 508, the degree of truth values (e.g., probability that the condition is present) for each condition are compared to a threshold value. If none of the degree of truth values exceeds the threshold value, the server returns to block 504 and receives additional data from the data streams 204, 206, 208. However, if one of the degree of truth values exceeds the threshold value, the server proceeds to block 510 and consults one or more decision tables to determine what, if anything, should be done to address the condition. Accordingly, fuzzy logic operations may be used on the data received via the data streams 204, 206, 208 to make truth determinations based on whether the data received from the data streams 204, 206, 208 confirms one or more truth models. Thus, a collection of states may be used to determine an underlying condition in an industrial environment. Each of the decision tables may correspond to one or more components within the system. Based on the one or more conditions input to one or more decision tables, the decision tables may help to identify what actions should be taken at respective assets to address the condition. In some embodiments, the server may generate a notification 512 to be transmitted (block 514) to the user for review (e.g., via the computing device) to notify the user of the condition.

Figure 10:
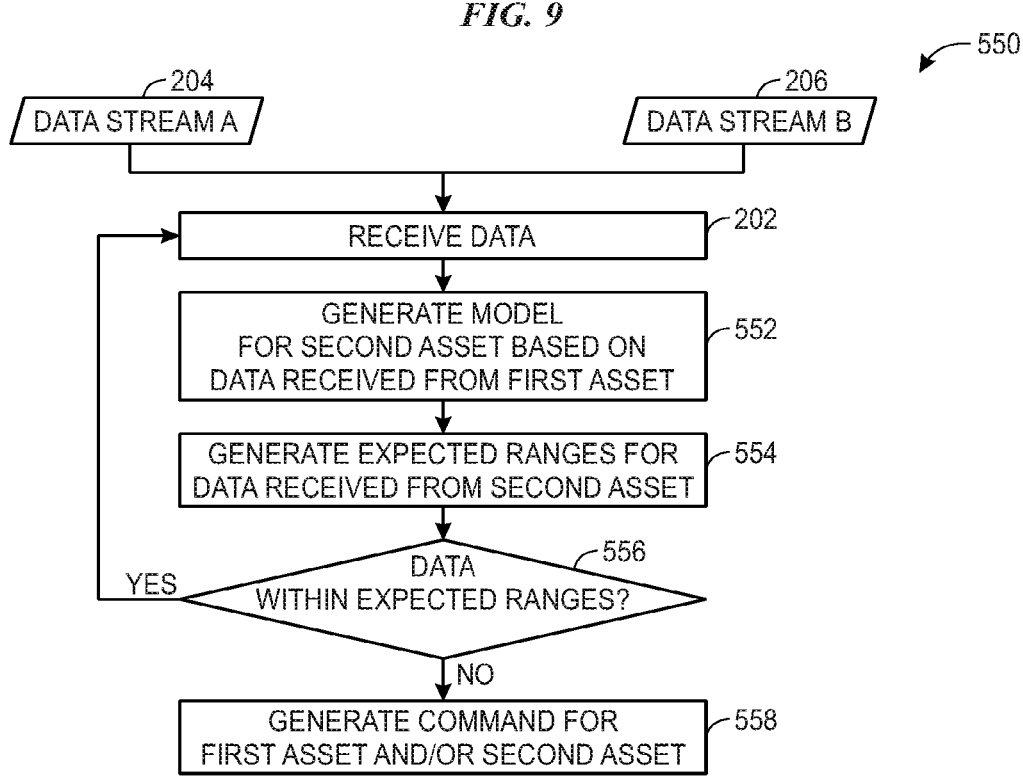
FIG. 10 illustrates a flow chart of a process for comparing downstream data to a model generated based on upstream data within the stream-based processing analysis system of FIG. 1, in accordance with embodiments presented herein.

FIG. 10 is a flow chart of a process 550 for analyzing data from a downstream node by comparing it to a model based on data from an upstream node. At block 202, data is received from an upstream node via the first data stream 204 and from a downstream node via the second data stream 206. For simplicity, only two data streams are shown in FIG. 10, however, it should be understood that the same techniques may be used with data streams from more than two nodes. At block 552, data received from a first asset at a first node via the first data stream 204 is used to model a condition for a second asset disposed at a second node, downstream of the first node. The model may be based on raw measurements taken at the first node (e.g., temperature, pressure, flow rate, etc.), based on an underlying condition at the first node, based on a state of the first asset of the first node, etc. At block 554, the server uses the model of the second asset disposed at the second node to generate a set of expected ranges that the server would expect to receive from the second asset disposed at the second node via the second data stream 206. At decision block 556, the server compares the data received from the second data stream 206 to the expected ranges. If the data received from the second asset at the second node via the second data stream 206 is within the expected values, the server may return to block 202 and receive more data from the data streams 204, 206. However, if the data received from the second asset at the second node via the second data stream 206 is not within the expected ranges, the server may generate a notification or recommend an action to adjust operation of the first or second asset (block 558) to bring data output by the second asset at the second node within the expected ranges. Though the instant embodiment includes assets disposed at upstream and downstream nodes, it should be understood that similar techniques may be used to use data from one or more nodes within an industrial environment to generate expected data ranges at one or more other nodes within the industrial environment and then compare measured data from those other nodes to the expected ranges as a way to analyze one or more assets operating within an industrial environment.

Example Implementations of Stream-Based Processing

Figure 11:
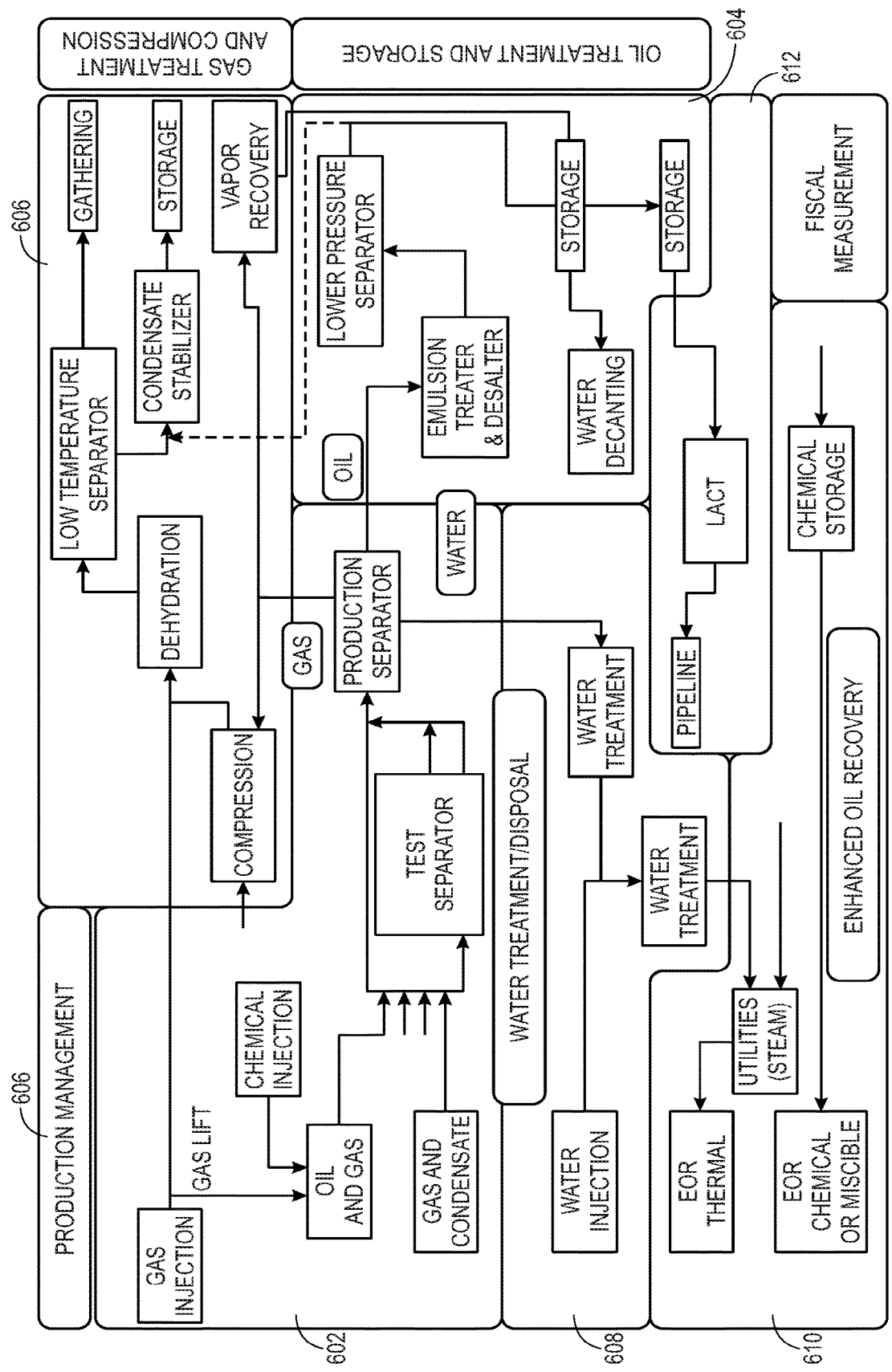
FIG. 11 illustrates a schematic illustrating various operations involved in hydrocarbon production, in accordance with embodiments presented herein.

As previously discussed, the stream-based processing analysis system 10 may be implemented with nodes 12 distributed horizontally and/or vertically at various locations throughout the hydrocarbon production chain. FIG. 11 is a schematic 600 illustrating various operations involved in hydrocarbon production. Box 602 represents oil and gas extraction. The extracted fluid is then separated into oil, gas, and water. The separated oil goes through an oil treatment and storage 604 process and then through a fiscal measurement process 612. The gas goes through a gas treatment and compression process 606. The water goes through a water treatment and disposal process 608. In some embodiments, the water may be used for an enhanced oil recovery process 610. For oil and gas applications, the nodes 12 of the stream-based processing analysis system 10 may be distributed horizontally along the hydrocarbon production chain, distributed vertically along some production process (e.g., the nodes include or are coupled to machines performing different steps of a process in series, or some combination thereof. In other embodiments, the nodes 12 may be part of different, but in some cases, related processes. For example, in one embodiment related to oil and gas extraction, the nodes 12 may be various wells extracting hydrocarbons from the same reservoir or deposit. In a second embodiment related to oil and case, the nodes 12 may correspond with steps along the process of extraction and processing (e.g., extraction, separation, transport, storage, decanting, refining, etc.

Hydrocarbon Production

Figure 12:
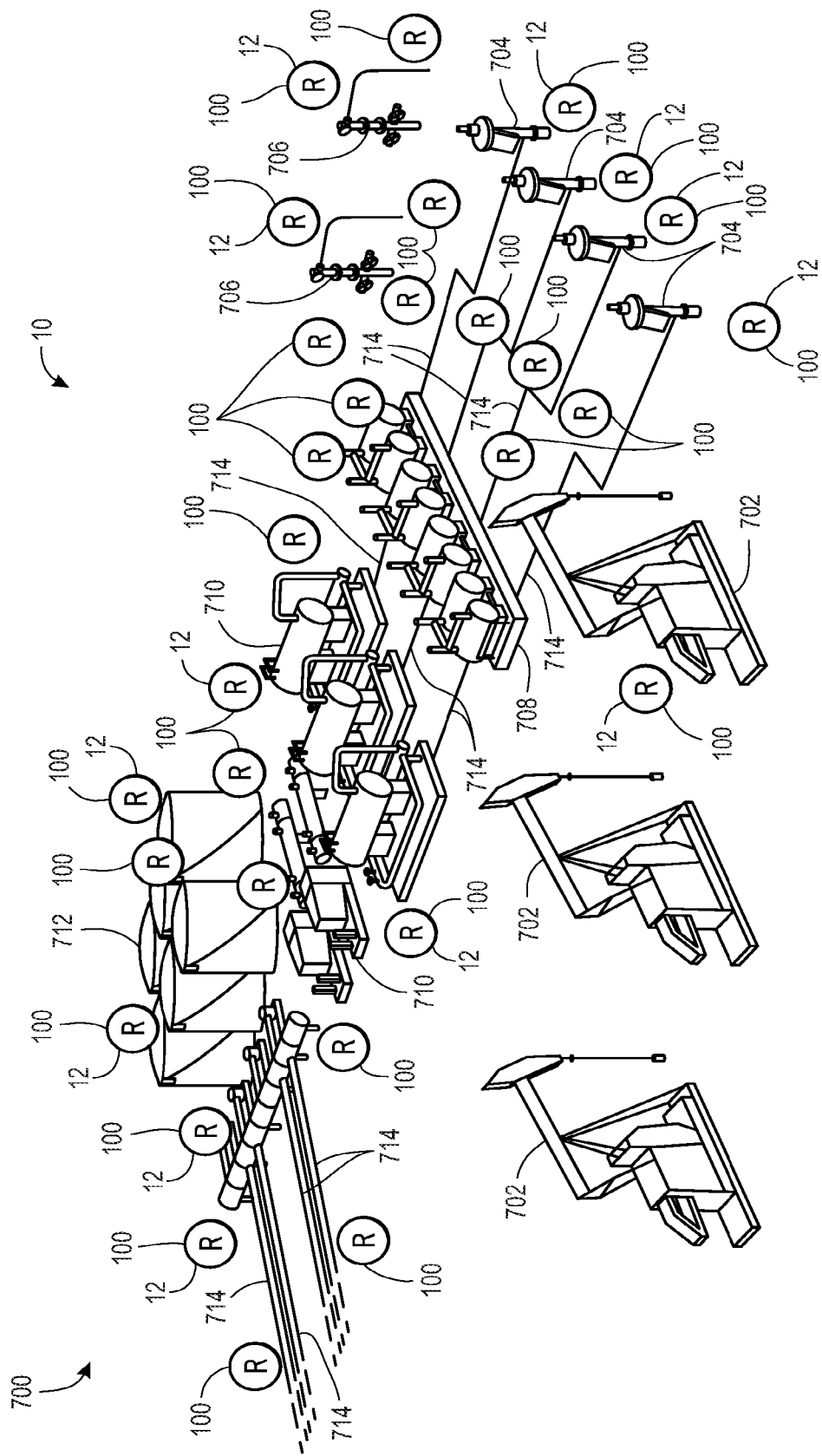
FIG. 12 illustrates a schematic of how stream-based processing may be applied at a hydrocarbon site, in accordance with embodiments presented herein.

FIG. 12 is a schematic illustrating how stream-based processing may be applied at a hydrocarbon site 700 of a hydrocarbon extraction system. The hydrocarbon site 700 may be an area in which hydrocarbons, such as crude oil and natural gas, may be extracted from the ground, processed, and stored. As such, the hydrocarbon site 700 may include a number of wells and a number of well devices that may control the flow of hydrocarbons being extracted from the wells. In one embodiment, the well devices at the hydrocarbon site 700 may include any device equipped to monitor and/or control production of hydrocarbons at a well site. As such, the well devices may include pumpjacks 702, submersible pumps 704, well trees 706, and the like. After the hydrocarbons are extracted from the surface via the well devices, the extracted hydrocarbons may be distributed to other devices such as wellhead distribution manifolds 708, separators 710, storage tanks 712, and the like. At the hydrocarbon site 700, the pumpjacks 702, submersible pumps 704, well trees 706, wellhead distribution manifolds 708, separators 710, and storage tanks 712 may be connected together via a network of pipelines 714. As such, hydrocarbons extracted from a reservoir may be transported to various locations at the hydrocarbon site 700 via the network of pipelines 714.

The pumpjack 702 may mechanically lift hydrocarbons (e.g., oil) out of a well when a bottom hole pressure of the well is not sufficient to extract the hydrocarbons to the surface. The submersible pump 704 may be an assembly that may be submerged in a hydrocarbon liquid that may be pumped. As such, the submersible pump 704 may include a hermetically sealed motor, such that liquids may not penetrate the seal into the motor. Further, the hermetically sealed motor may push hydrocarbons from underground areas or the reservoir to the surface.

The well trees 706 or Christmas trees may be an assembly of valves, spools, and fittings used for natural flowing wells. As such, the well trees 706 may be used for an oil well, gas well, water injection well, water disposal well, gas injection well, condensate well, and the like. The wellhead distribution manifolds 708 may collect the hydrocarbons that may have been extracted by the pumpjacks 702, the submersible pumps 704, and the well trees 706, such that the collected hydrocarbons may be routed to various hydrocarbon processing or storage areas in the hydrocarbon site 700.

The separator 710 may include a pressure vessel that may separate well fluids produced from oil and gas wells into separate gas and liquid components. For example, the separator 710 may separate hydrocarbons extracted by the pumpjacks 702, the submersible pumps 704, or the well trees 706 into oil components, gas components, and water components. After the hydrocarbons have been separated, each separated component may be stored in a particular storage tank 712. The hydrocarbons stored in the storage tanks 712 may be transported via the pipelines 714 to transport vehicles, refineries, and the like.

The hydrocarbon site 700 may also include or be a part of the stream-based processing analysis system 10. As previously discussed, the stream-based processing analysis system 10 may include a plurality of nodes 12 placed at various locations in the hydrocarbon site 700 to monitor or provide information related to certain aspects of the hydrocarbon site 700. For example, each node 12 may include the RTU, or any computing device that may include communication abilities, processing abilities, and the like. For discussion purposes, the nodes 12 will be embodied as the RTUs 100, or groups of RTUs 100 throughout the hydrocarbon site 700. However, it should be understood that the node 12 may be any component capable of monitoring and/or controlling various components at the hydrocarbon site 700.

As previously discussed, each RTU 100 may include sensors or may be coupled to various sensors that may monitor various properties associated with a component at the hydrocarbon site 700. The RTU 100 may then analyze the various properties associated with the component and may control various operational parameters of the component. For example, the RTU 100 may measure a pressure or a differential pressure of a well or a component (e.g., storage tank 712) in the hydrocarbon site 700. The RTU 100 may also measure a temperature of contents stored inside a component in the hydrocarbon site 700, an amount of hydrocarbons being processed or extracted by components in the hydrocarbon site 700, and the like. The RTU 100 may also measure a level or amount of hydrocarbons stored in a component, such as the storage tank 712.

In one embodiment, the RTU 100 may include a sensor that may measure pressure, temperature, fill level, flow rates, and the like. The RTU 100 may also include a transmitter, such as a radio wave transmitter, that may transmit data acquired by the sensor via an antenna or the like. The sensor in the RTU 100 may be wireless sensors that may be capable of receive and sending data signals between RTUs 100. The RTU 100 may transmit data acquired by the sensor or data processed by a processor to other monitoring systems, a router device, a supervisory control and data acquisition (SCADA) device, or the like. As such, the RTU 100 may enable users to monitor various properties of various components in the hydrocarbon site 700 without being physically located near the corresponding components.

In operation, the RTU 100 may receive real-time or near real-time data associated with a well device. The data may include, for example, tubing head pressure, tubing head temperature, case head pressure, flowline pressure, wellhead pressure, wellhead temperature, and the like. In any case, the RTU 100 may analyze the real-time data with respect to static data that may be stored in a memory of the RTU 100. The static data may include a well depth, a tubing length, a tubing size, a choke size, a reservoir pressure, a bottom hole temperature, well test data, fluid properties of the hydrocarbons being extracted, and the like. The RTU 100 may also analyze the real-time data with respect to other data acquired by various types of instruments (e.g., water cut meter, multiphase meter) to determine an inflow performance relationship (IPR) curve, a desired operating point for the wellhead, key performance indicators (KPIs) associated with the wellhead, wellhead performance summary reports, and the like. Although the RTU 100 may be capable of performing the above-referenced analyses, the RTU 100 may not be capable of performing the analyses in a timely manner. Moreover, by just relying on the processor capabilities of the RTU 100, the RTU 100 is limited in the amount and types of analyses that it may perform. Moreover, since the RTU 100 may be limited in size, the data storage abilities may also be limited.

Keeping the foregoing in mind, in certain embodiments, the RTU 100 may establish a communication link with the stream-based processing analysis system 10 described above. As such, the stream-based processing analysis system 10 may use its larger processing capabilities to analyze data acquired by multiple RTUs 100 in real time or near real time to determine a condition at the hydrocarbon site 700 based on data collected from the various RTUs 100 or nodes 12. Moreover, the stream-based processing analysis system may access historical data associated with the respective RTU 100, data associated with well devices associated with the respective RTU 100, data associated with the hydrocarbon site 700 associated with the respective RTU 100 and the like to further analyze the data acquired by the multiple RTUs 100 and determine a condition at the hydrocarbon site 700 based on the collected data.

For example, in one embodiment, a plurality of RTUs 100 may collect data from multiple submersible pump wells 704 extracting hydrocarbons from the same reservoir and provide streams of data to the stream-based processing analysis system 10. The stream-based processing analysis system 10 may examine a plurality of parameters (e.g., 5-8 parameters) for each well and determine that one or more of the wells is experiencing a problem. For example, the server 22 may receive similar stream-based operational data from all but one submersible pump well 704. Since each of the stream-based datasets from the submersible pump wells 704 are related to the same reservoir, the server 22 may determine that the single submersible pump well 704 is experiencing a problem due to the fact that the other similar type of submersible pump wells 704 operating in the same reservoir do not have data that matches the single submersible pump well 704. In some embodiments, the analysis for identifying the problem may also include, for example, applying a model, performing fuzzy logic, etc. to determine a condition of the wells, and in some cases, a degree of confidence in that condition. After identifying the problem or the problematic dataset, the server 22 may then consult one or more decision tables to determine a recommended action. The decision table may be prepopulated with certain actions for various circumstances. However, it should be noted that the server 22 may also employ artificial intelligence modules or schemes to determine an action to perform to address the identified problem. For example, the server 22 may analyze the other streaming data received from components within a proximity of the one submersible pump well 704. The server 22 may then determine whether the streaming data acquired by adjacent components of the one submersible pump well 704 matches expected values or matches the values received from adjacent components of the other submersible pump wells 704. If the values of the adjacent component does not match an expected value, the server 22 may determine that a problem may exist in the one submersible pump well 704 that may involve a technician to repair. As such, the server 22 may send a command to the one submersible pump well 704 to shut down or stop operations. If the decision tables result in multiple possible recommended actions, the stream-based processing analysis system 10 may perform some additional analysis (e.g., risk/reward, calculating cost, probability of success, etc.) to determine a preferred action.

In another oil and gas example, multiple wells (e.g., submersible pump wells 704) may provide fluid to a single separator 710. The separator may be outfitted with an RTU 100 that acts as a node 12 and includes a water cut sensor to determine the ratio of water in the fluid. Each of the wells 704 may also include an RTU 100 that acts as a node 12, however, each of the wells may not be outfitted with a water cut sensor in order to reduce costs. The stream-based processing analysis system 10 may collect data from the various nodes 12 and/or wells 704. The stream-based analysis system 10 may recognize that the incoming data is of the same type and compare data from each of multiple data streams to determine that the ratio of water in the fluid being provided to the separator 710 by the wells 704 has a higher ratio of water than desired. This determination may be made, for example, by using the received data to update a model, using fuzzy logic to determine a state for each of the incoming data streams and infer an underlying condition based on the collection of states, by directly comparing the data from multiple data streams, etc. The stream-based processing analysis system 10 may then determine based on the other measured values (pressures, flow rates, etc.) which of the wells 704 is responsible to the high ratio of water. The condition or conditions may then act as inputs for one or more decision tables, a machine learning algorithm, a script, etc. to determine an action to bring the water cut back into a desirable range. For example, the stream-based processing analysis system 10 may choke down or shut down the well in question to bring the water cut back to the desired range.

In a third embodiment, the well tress 706 may be used for gas injection wells and outfitted with RTUs 100 that act as a nodes 12. The stream-based processing analysis system 10 may determine based on data collected from the various nodes that back pressure is building up in one or more of the wells. For example, data of the same type from the various nodes may be compared to identify outlier nodes. In some embodiments, once an outlier node has been identified, one or more models, one or more truth tables, machine learning algorithms, fuzzy logic algorithms, scripts, or some combination thereof, may be used to perform additional analysis to determine why backpressure is building and then determine what action should be taken to relieve the back pressure (e.g., via one or more decision tables, machine learning, a historical database, etc.). In other embodiments, data collected from the RTUs 100 may be used to model the underlying condition. In some cases, data from each of the RTUs may be compared to the model to determine if data from any of the RTUs 100 deviate from the expected values. The stream-based processing analysis system 10 may then determine what, if anything should be done to bring the asset associated with the RTU 100 back into a more desirable operating condition. For example, the stream-based processing analysis system 10 may then use data collected at the nodes to determine what actions should be taken to relieve the backpressure. Further, the stream-based processing analysis system 10 may then flag data leading up to the back pressure build up, combine the data with data from other instances of backpressure build up, and use machine learning to identify the conditions correlated with the back pressure buildup such that future instances of back pressure build up can be caught earlier or avoided all together.

Chemical Processing

Figure 13:
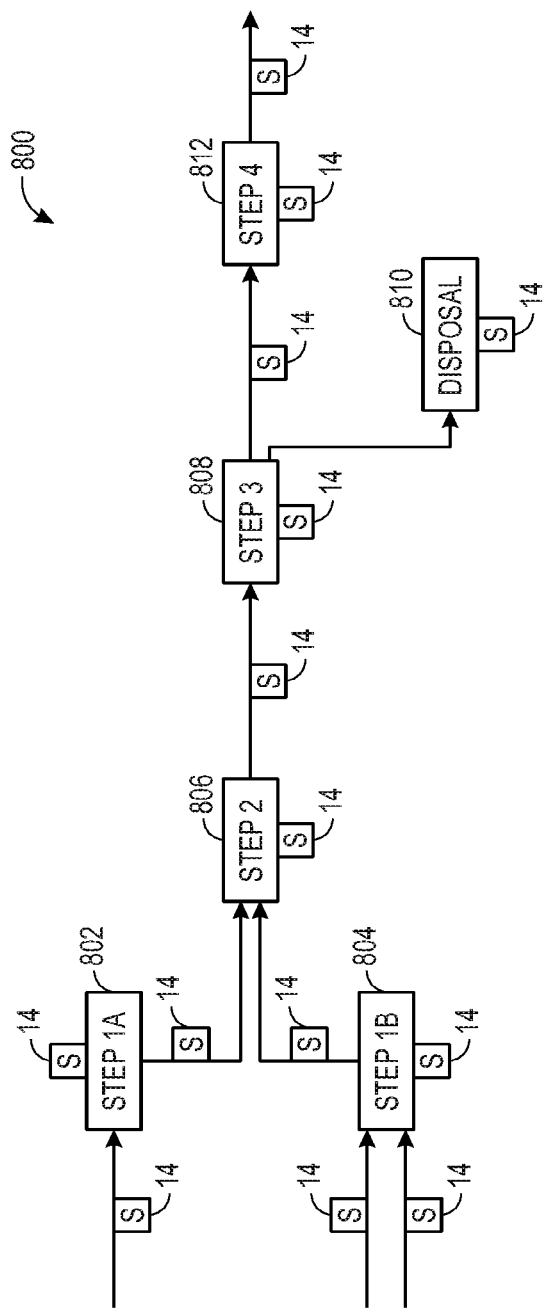
FIG. 13 illustrates a schematic of a chemical process that may utilize the stream-based processing analysis system of FIG. 1, in accordance with embodiments presented herein.

Though FIGS. 10 and 11 describe specific applications of the stream-based processing analysis system to various aspects of oil and gas production, it should be understood that the application of the stream-based processing analysis system is not limited to oil and gas production. For example, FIG. 13 is a schematic of a chemical process 800 that may utilize the stream-based processing analysis system. Step 1A 802 has a single input and Step 1B 804 has two inputs and a single output. The outputs of Step 1A 802 and Step 1B 804 are combined in Step 2 806, which has a single output. Step 3 808 has a single input and two outputs. One of the outputs is directed to a disposal 810 and the other output is directed to Step 4 812, which has a single input and a single output. As shown, the sensors 14 may be disposed throughout the process to measure various parameters (e.g., pressure, temperature, flow rate, etc.) during the process. The sensors 14 may then provide data to the stream-based processing analysis system for analysis. In some embodiments, each sensor 14 may be considered a node. In other embodiments, two or more of the sensors 14 may be grouped to form a node. The stream-based processing analysis system 10 may analyze data collected from the various nodes in real time or near real time and determine what if anything should be done to improve the process 800. In some embodiments, sensor data of the same type from different nodes may be compared to determine when data from a node is outside of an expected range. In other embodiments, data from a cluster of nodes may be compared to determine if any outlier nodes are experiencing a condition that should be addressed. In further embodiments, data from upstream nodes may be used to model a condition at one or more downstream nodes. The data provided by the one or more downstream nodes may then be compared to the expected values produced by the model to evaluate if the asset associated with the downstream node is operating as desired. For example, the stream-based processing analysis system may determine that a flow rate between Step 3 808 and Step 4 812 is less than desired, determine that opening a valve that controls the one of the inputs to Step 1B 804 is likely to solve the problem, and then either automatically take that action or recommend that a user take that action.

Food and Beverage Processing

Figure 14:
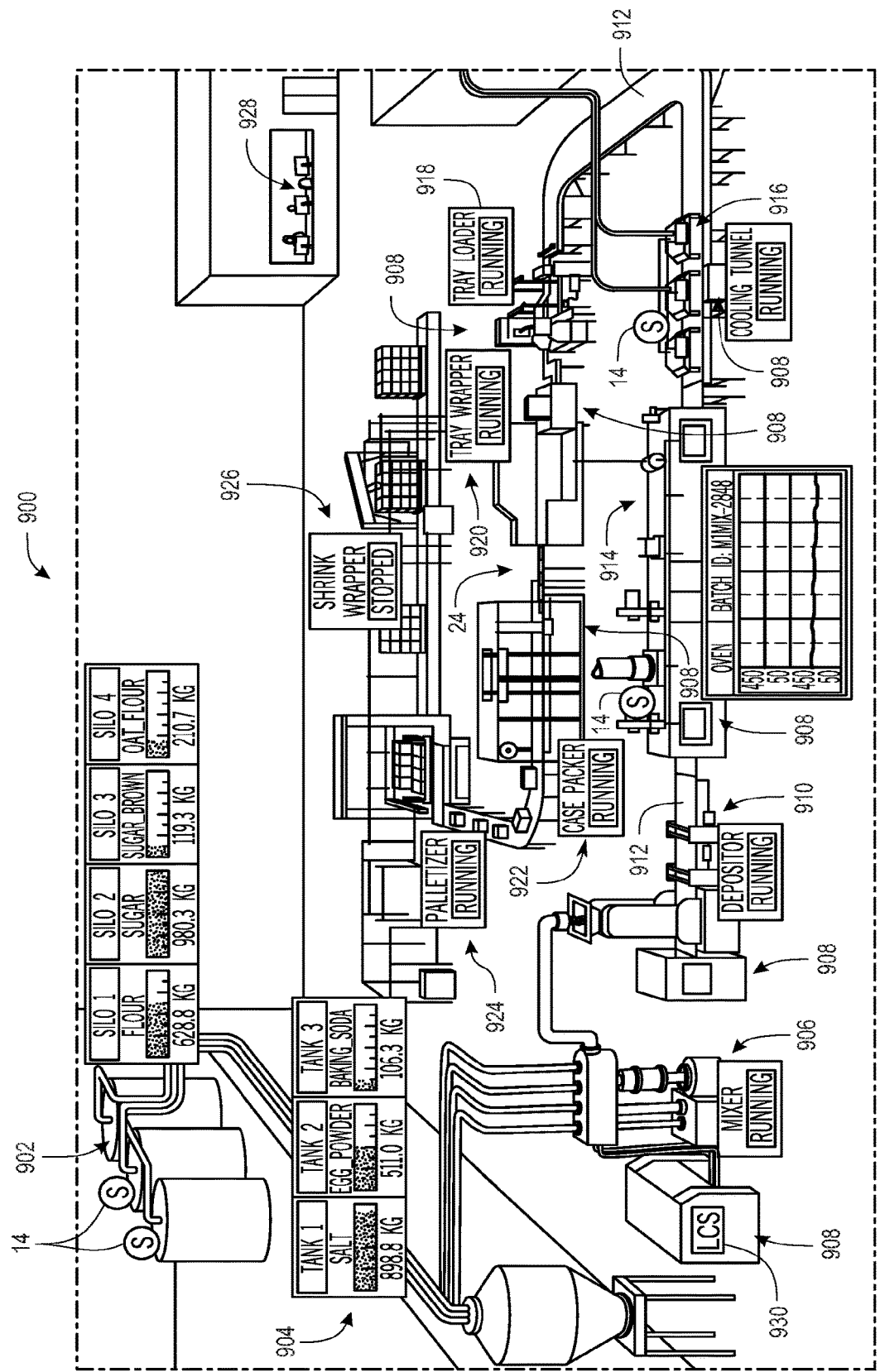
FIG. 14 illustrates an example industrial automation system utilizing stream-based processing employed by a food manufacturer, in accordance with embodiments presented herein.

Additionally, the stream-based processing analysis system may be used in the food and beverage industry (e.g., with a food and/or beverage processing system). For example, FIG. 14 illustrates an example industrial automation system 900 utilizing stream-based processing employed by a food manufacturer. The example industrial automation system 900 for a food manufacturer may include silos 902 and tanks 904. The silos 902 and the tanks 904 may store different types of raw material, such as grains, salt, yeast, sweeteners, flavoring agents, coloring agents, vitamins, minerals, and preservatives. In some embodiments, sensors 14 may be positioned within or around the silos 902, the tanks 904, or other suitable locations within the industrial automation system 900 to measure certain properties, such as temperature, mass, volume, pressure, humidity, and the like.

The raw materials may be provided to a mixer 906, which may mix the raw materials together according to a specified ratio. The mixer 906 and other machines in the industrial automation system 900 may employ certain industrial automation devices 908 to control the operations of the mixer 906 and other machines. The industrial automation devices 908 may include controllers, input/output (I/O) modules, motor control centers, motors, human machine interfaces (HMIs), operator interfaces, contactors, starters, sensors 14, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 906 may provide a mixed compound to a depositor 910, which may deposit a certain amount of the mixed compound onto conveyor 912. The depositor 910 may deposit the mixed compound on the conveyor 912 according to a shape and amount that may be specified to a control system for the depositor 910. The conveyor 912 may be any suitable conveyor system that transports items to various types of machinery across the industrial automation system 900. For example, the conveyor 912 may transport deposited material from the depositor 910 to an oven 914, which may bake the deposited material. The baked material may be transported to a cooling tunnel 916 to cool the baked material, such that the cooled material may be transported to a tray loader 918 via the conveyor 912. The tray loader 918 may include machinery that receives a certain amount of the cooled material for packaging. By way of example, the tray loader 918 may receive 25 ounces of the cooled material, which may correspond to an amount of cereal provided in a cereal box.

A tray wrapper 920 may receive a collected amount of cooled material from the tray loader 918 into a bag, which may be sealed. The tray wrapper 920 may receive the collected amount of cooled material in a bag and seal the bag using appropriate machinery. The conveyor 912 may transport the bagged material to case packer 922, which may package the bagged material into a box. The boxes may be transported to a palletizer 924, which may stack a certain number of boxes on a pallet that may be lifted using a forklift or the like. The stacked boxes may then be transported to a shrink wrapper 926, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 900, the industrial automation devices 908 may be used to provide power to the machinery used to perform certain tasks, provide protection to the machinery from electrical surges, prevent injuries from occurring with human operators in the industrial automation system 900, monitor the operations of the respective device, communicate data regarding the respective device to a supervisory control system 928, and the like. In some embodiments, each industrial automation device 908 or a group of industrial automation devices 908 may be controlled using a local control system 930. The local control system 932 may include receive data regarding the operation of the respective industrial automation device 908, other industrial automation devices 908, user inputs, and other suitable inputs to and use stream-base processing to control the operations of the respective industrial automation device(s) 908.

The stream-based processing analysis system 10 may analyze data collected from the various nodes in real time or near real time and determine what if anything should be done to improve the industrial automation system 900. In some embodiments, sensor data of the same type from different nodes may be compared to determine when data from a node is outside of an expected range. In other embodiments, data from a cluster of nodes may be compared to determine if any outlier nodes are experiencing a condition that should be addressed. In further embodiments, data from upstream nodes may be used to model a condition at one or more downstream nodes. The data provided by the one or more downstream nodes may then be compared to the expected values produced by the model to evaluate if the asset associated with the downstream node is operating as desired. In some embodiments, the analysis for identifying the problem may also include, for example, applying a model, performing fuzzy logic, etc. to determine a condition of the one or more assets within the industrial automation system 900, and in some cases, a degree of confidence in that condition. After identifying the problem or the problematic dataset, the server may consult one or more decision tables to determine a recommended action. The decision table may be prepopulated with certain actions for various circumstances. However, the server may also employ artificial intelligence techniques to determine an action to perform to address the identified problem. For example, the server may analyze the other streaming data received from components within a proximity of an asset of the industrial automation system 900. The server may then determine whether the streaming data acquired by adjacent components of the asset matches expected values or matches the values received from adjacent components. If the values of the adjacent component does not match an expected value, the server may determine that a problem may exist in the asset that may involve a technician to repair. As such, the server may send a command to the asset or the larger industrial automation system 900 to shut down or stop operations.

Mining

As with previously discussed embodiments in which stream-based processing is used to monitor and control multiple wells extracting hydrocarbons from a single reservoir, embodiments are also envisaged for monitoring and controlling multiple mining assemblies mining a single formation. For example, returning to FIG. 1, in one embodiment, a plurality of nodes 12 may collect data from multiple mining assemblies extracting materials from the same formation. The stream-based processing analysis system 10 may examine one or more parameter for each node 12 and determine that one or more of the nodes 12 is experiencing a problem. For example, the server 22 may receive similar stream-based operational data from all but one node 12. Since each of the stream-based datasets from the nodes 12 are related to the same formation, the server 22 may determine that the single mining assembly is experiencing a problem due to the fact that the other mining assemblies operating on the same formation do not have data that matches the single mining assembly. In some embodiments, the analysis for identifying the problem may also include, for example, applying a model, performing fuzzy logic, etc. to determine a condition of the mining assemblies, and in some cases, a degree of confidence in that condition. After identifying the problem or the problematic dataset, the server 22 may then consult one or more decision tables to determine a recommended action. The decision table may be prepopulated with certain actions for various circumstances. However, it should be noted that the server 22 may also employ artificial intelligence modules or schemes to determine an action to perform to address the identified problem. For example, the server 22 may analyze the other streaming data received from components within a proximity of the one mining assembly. The server 22 may then determine whether the streaming data acquired by adjacent components of the one mining assembly matches expected values or matches the values received from adjacent components of the other mining assemblies. If the values of the adjacent mining assembly does not match an expected value, the server 22 may determine that a problem may exist in the one mining assembly that may involve a technician to repair. As such, the server 22 may send a command to the one mining assembly to shut down or stop operations. If the decision tables result in multiple possible recommended actions, the stream-based processing analysis system 10 may perform some additional analysis (e.g., risk/reward, calculating cost, probability of success, etc.) to determine a preferred action.

The disclosed techniques include receiving streams of data from multiple nodes within the network, using the data received via the data streams to model one or more underlying conditions in real time or near real time (e.g., within seconds or minutes), and then determine what, if anything, should be done to control one or more of the assets within the network to make the industrial process run more efficiently. The analysis may include, for example, using one or more analysis engines to maintain one or more models (e.g., state based models) of various aspects of the industrial process, run scripts or routines on the received data, performing queries based on the data, updating an analysis function, applying fuzzy logic, consulting one or more truth tables, and so forth to analyze the received data in real time or near real time. In some embodiments, the received data may be cleansed or preprocessed to check for frozen data, transform units, identify data types, provide relevant data to the appropriate analysis engines, etc. Based on the underlying condition, decision tables may be referenced to determine what, if any, action to recommend. In some embodiments, the recommended action may be automatically taken. In other embodiments, the recommended action may be recommended to a user for approval before the action is taken. In further embodiments, the recommended may be recommended for the user to complete on her or her own. Accordingly, the disclosed techniques provide real time or near real time feedback for one or more assets within a multi-node network based on a holistic model of the network generated using streams of data provided by multiple nodes.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
a server communicatively coupled to a first asset disposed at a first node comprising a first sensor and a first actuator of an industrial automation system and a second asset disposed at a second node comprising a second sensor downstream the first node and a second actuator of the industrial automation system, wherein the server is configured to:
receive a first set of stream-based data streamed from the first sensor associated with the first asset;
generate a modeled condition for the second asset using a model that receives the first set of stream-based data as an input and provides the modeled condition for the second asset as an output;
generate an expected set of stream-based data associated with the second asset using the modeled condition for the second asset;
receive a second set of stream-based data streamed from a second sensor associated with the second asset;
compare, on a continuous basis, the second set of stream-based data with the expected set of stream-based data, wherein the second set of stream-based data is synchronized in time with the expected set of stream-based data; and
initiate an automated action to adjust an operation of the first asset or the second asset in response to the second set of stream-based data being outside of a threshold from the expected set of stream-based data, wherein the automated action includes at least one of adjusting the first actuator or adjusting the second actuator,
wherein the second asset comprises a device separate from a device of the first asset, wherein the first asset comprises one or more controls separate from one or more controls of the second asset, and wherein the first asset is controlled separately from the second asset.

2. The system of claim 1, wherein the modeled condition is generated using the model based on one or more raw measurements taken at the first node, wherein the one or more raw measurements comprise temperature, pressure, and flow rate.

3. The system of claim 1, wherein the modeled condition is generated using the model based on based on an underlying condition at the first node.

4. The system of claim 1, wherein the modeled condition is generated using the model based on a state of the first asset at the first node.

5. The system of claim 1, wherein the server device is configured to:
monitor a first alarm limit drift with respect to a first portion of the first set of stream-based data; and
adjust a second alarm limit for a second portion of the second set of data based on the first alarm drift.

6. The system if claim 1, wherein the industrial system comprises a chemical processing system, a food and beverage processing system, a hydrocarbon extraction system, or a mining system.

7. A method, comprising:
receiving a first set of stream-based data streamed from a first sensor associated with a first asset at a first node comprising the first sensor and a first actuator disposed at an industrial automation system;
generating a modeled condition for a second asset at a second node comprising a second sensor downstream the first node and a second actuator disposed at the industrial automation system using a model that receives the first set of stream-based data as an input and provides the modeled condition for the second asset as an output;
generating an expected set of stream-based data associated with the second asset using the modeled condition for the second asset;
receiving a second set of stream-based data streamed from the second sensor associated with the second asset;
comparing, on a continuous basis, the second set of stream-based data with the expected set of stream-based data, wherein the second set of stream-based data is synchronized in time with the expected set of stream-based data; and
initiating an automated action to adjust an operation of the first asset or the second asset in response to the second set of stream-based data being outside of a threshold from the expected set of stream-based data, wherein the automated action includes at least one of adjusting the first actuator or adjusting the second actuator,
wherein the second asset comprises a device separate from a device of the first asset, wherein the first asset comprises one or more controls separate from and one or more controls of the second asset, and wherein the first asset is controlled separately from the second asset.

8. The method of claim 7, wherein the modeled condition is generated using the model based on one or more raw measurements taken at the first node, wherein the one or more raw measurements comprise temperature, pressure, and flow rate.

9. The method of claim 7, wherein the modeled condition is generated using the model based on based on an underlying condition at the first node.

10. The method of claim 7, wherein the modeled condition is generated using the model based on a state of the first asset at the first node.

11. The method of claim 7, further comprising:
monitoring a first alarm limit drift with respect to a first portion of the first set of stream-based data; and
adjusting a second alarm limit for a second portion of the second set of data based on the first alarm drift.

12. The method if claim 7, wherein the industrial system comprises a chemical processing system, a food and beverage processing system, a hydrocarbon extraction system, or a mining system.

13. A non-transitory computer-readable medium having stored thereon instructions that, in response to execution, cause a system comprising a processor to perform operations, the operations comprising:
receiving a first set of stream-based data streamed from a first sensor associated with a first asset at a first node comprising the first sensor and a first actuator disposed at an industrial automation system;
generating a modeled condition for a second asset at a second node comprising a second sensor downstream the first node and a second actuator disposed at the industrial automation system using a model that receives the first set of stream-based data as an input and provides the modeled condition for the second asset as an output;
generating an expected set of stream-based data associated with the second asset using the modeled condition for the second asset;
receiving a second set of stream-based data streamed from the second sensor associated with the second asset;
comparing, on a continuous basis, the second set of stream-based data with the expected set of stream-based data, wherein the second set of stream-based data is synchronized in time with the expected set of stream-based data; and
initiating an automated action to adjust an operation of the first asset or the second asset in response to the second set of stream-based data being outside of a threshold from the expected set of stream-based data, wherein the automated action includes at least one of adjusting the first actuator or adjusting the second actuator,
wherein the second asset comprises a device separate from a device of the first asset, wherein the first asset comprises one or more controls separate from and one or more controls of the second asset, and wherein the first asset is controlled separately from the second asset.

14. The non-transitory computer-readable medium of claim 13, wherein the modeled condition is generated using the model based on one or more raw measurements taken at the first node, wherein the one or more raw measurements comprise temperature, pressure, and flow rate.

* * * * *